United States Patent
Hsu et al.

(10) Patent No.: US 7,667,718 B2
(45) Date of Patent: Feb. 23, 2010

(54) IMAGE SCALING CIRCUIT AND METHOD THEREOF

(75) Inventors: Hsiu-Hsing Hsu, Taichung County (TW); Min-Hui Chu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 444 days.

(21) Appl. No.: 11/559,412

(22) Filed: Nov. 14, 2006

(65) Prior Publication Data

US 2008/0122872 A1 May 29, 2008

(30) Foreign Application Priority Data

Sep. 25, 2006 (TW) ............... 95135344 A

(51) Int. Cl.
G09G 5/36 (2006.01)
G09G 5/00 (2006.01)
(52) U.S. Cl. ............. 345/668; 345/619; 345/667; 345/560
(58) Field of Classification Search ............ 345/619, 345/667, 668, 560
See application file for complete search history.

(56) References Cited

U.S. PATENT DOCUMENTS

| 5,452,235 A | * | 9/1995 | Isani ..................... 710/68 |
| 6,525,742 B2 | * | 2/2003 | Nonomura et al. ........ 345/603 |
| 6,661,427 B1 | * | 12/2003 | MacInnis et al. ........ 345/660 |
| 2004/0012614 A1 | * | 1/2004 | Shim et al. ............. 345/660 |
| 2004/0056874 A1 | * | 3/2004 | MacInnis et al. ........ 345/660 |

* cited by examiner

Primary Examiner—M Good Johnson
(74) Attorney, Agent, or Firm—Jianq Chyun IP Office

(57) ABSTRACT

An image scaling circuit and a method for scaling an image into images with different ratios are provided. The image scaling circuit includes a line buffer memory apparatus, a line buffer control apparatus, a first and a second scaling circuit. The first scaling circuit is coupled to the line buffer memory apparatus, and performs a first image scaling interpolation operation on the data output by the line buffer memory apparatus. The second scaling circuit is coupled to the line buffer memory apparatus, and performs a second image scaling interpolation operation on the data output by the line buffer memory apparatus. The line buffer control apparatus is coupled to the line buffer memory apparatus, the first scaling circuit and the second scaling circuit, for controlling the line buffer memory apparatus to receive or output a scan line data according to the operation status of the first and second scaling circuits.

19 Claims, 20 Drawing Sheets

IMAGE SCALING CIRCUIT AND METHOD THEREOF

CROSS-REFERENCE TO RELATED APPLICATION

This application claims the priority benefit of Taiwan application serial no. 95135344, filed Sep. 25, 2006. All disclosure of the Taiwan application is incorporated herein by reference.

BACKGROUND OF THE INVENTION

1. Field of the Invention

The present invention relates to an image scaling control circuit and a method thereof. More particularly, the present invention relates to the architecture of an image scaling control circuit for scaling an image into at least two images with different scaling ratios at the same time, and a memory control method thereof.

2. Description of Related Art

Recently, flat panel displays (FPDs), for example, LCDs are widely used. Along with the improvement in semiconductor technology, an LCD has various advantages, such as low electric power consumption, light and thin, high resolution, high color saturation and long life span. Therefore, LCDs are widely used in electronic products indispensable to people's life, such as the liquid crystal screens of notebooks or desktop computers and LCD TVs.

As an FPD usually has only one rated resolution, an image scaling circuit must be provided between an input image signal and a panel to scale the resolution of the input image signal to fit the rated resolution of the FPD. For example, if the resolution of the input image signal is 640*480 while the rated resolution of the FPD is 1024*768, the image scaling circuit is needed to convert the input image signal with the resolution of 640*480 into a signal with the resolution of 1024*768 required by the panel through an interpolation operation.

Generally, a set of line buffer memories are built in a conventional image scaling circuit for the use of operation registration of the image scaling circuit. When applied to a dual-display panel, a digital camera or a dual-screen handset, etc. with different resolutions, and the same image must be scaled to two images with different ratios, two sets of image scaling circuits are needed, wherein each set includes a set of line buffer memories. As such, the cost is undoubtedly increased. In addition, if two sets of image scaling circuits should be disposed on a circuit board, the circuit layout will unavoidably become more difficult, and interference may occur easily.

Therefore, an apparatus and a method thereof are needed to solve the above problems, wherein the two sets of image scaling circuits are integrated and share a set of line buffer memories.

SUMMARY OF THE INVENTION

Accordingly, the present invention is directed to an image scaling circuit for integrating a plurality of scaling circuits and making the circuits share the same line buffer memory, thus achieving the efficacy of scaling an image into images with various ratios.

The present invention is further directed to provide an image scaling method for sharing the same line buffer memory and scaling an image into images with at least two different ratios, thus reducing the cost.

The present invention provides an image scaling circuit, which comprises a line buffer memory apparatus, a first scaling circuit, a second scaling circuit and a line buffer control apparatus. The first scaling circuit is coupled to the line buffer memory apparatus, and performs a first image scaling interpolation operation on the data output by the line buffer memory apparatus. The second scaling circuit is coupled to the line buffer memory apparatus, and performs a second image scaling interpolation operation on the data output by the line buffer memory apparatus. The line buffer control apparatus is coupled to the line buffer memory apparatus, the first scaling circuit and the second scaling circuit, for controlling the line buffer memory apparatus to receive or output a scan line data according to the operation status of the first and second scaling circuits.

According to an embodiment of the present invention, the line buffer control apparatus comprises a vertical scaling control unit and a horizontal scaling control unit. The vertical scaling control unit comprises a first vertical scaling parameter and a second vertical scaling parameter. The vertical scaling control unit receives a line buffer read end signal and outputs a vertical valid signal. When the line buffer read end signal is generated, a first accumulated value plus the first vertical scaling parameter is taken as the first accumulated value and the operation part of the first accumulated value is output; and a second accumulated value plus the second vertical scaling parameter is taken as the second accumulated value and the operation part of the second accumulated value is output. When the integer part of the first accumulated value is greater than that of the second accumulated value, upon the generation of the line buffer read end signal, the second accumulated value plus the second vertical parameter is taken as the second accumulated value and the operation part of the second accumulated value is output, until the second accumulated value is equal to or greater than the integer part of the first accumulated value (vice versa, i.e., when the integer part of the second accumulated value is greater than that of the first accumulated value, upon the generation of the line buffer read end signal, the first accumulated value plus the first vertical scaling parameter is taken as the first accumulated value and the operation part of the first accumulated value is output, until the first accumulated value is equal to or greater than the integer part of the second accumulated value). When the second accumulated value is equal to or greater than the integer part of the first accumulated value and the line buffer read end signal is enabled, the $(i-1)_{th}$ scan line data stored in the line buffer memory apparatus is erased, the line buffer memory apparatus is controlled to receive the $(i+1)_{th}$ scan line data, and the vertical valid signal is generated. The horizontal scaling control unit, comprising a first horizontal scaling parameter and a second horizontal scaling parameter, is coupled to the vertical scaling control unit, receives the vertical valid signal and outputs an address added value of the line buffer memory apparatus. During each preset time, a third accumulated value plus the first horizontal scaling parameter is taken as the third accumulated value and the operation part of the third accumulated value is output; a fourth accumulated value plus the second horizontal scaling parameter is taken as the fourth accumulated value and the operation part of the fourth accumulated value is output; an address added value is output according to the integer parts of the third and fourth accumulated values, for controlling the line buffer memory apparatus to output a data. When the integer part of the third accumulated value is greater than that of the fourth accumulated value, the fourth accumulated value plus the second horizontal scaling parameter is taken as the fourth accumulated value, until the fourth accumulated value is equal to or greater than the integer part of the third accumulated value, wherein "i" is a natural number greater than 1, and vice versa (i.e., when the integer part of the fourth accumulated value is greater than that of the third accumulated value).

According to an embodiment of the present invention, the first scaling circuit is coupled to the horizontal scaling control unit, the vertical scaling control unit and the line buffer memory apparatus, so as to perform a first image scaling interpolation operation on the data output by the line buffer memory apparatus according to the operation parts of the first and third accumulated values.

According to an embodiment of the present invention, the second scaling circuit is coupled to the horizontal scaling control unit, the vertical scaling control unit and the line buffer memory apparatus, so as to perform a second image scaling interpolation operation on the data output by the line buffer memory apparatus according to the operation parts of the second and fourth accumulated values.

The present invention provides an image scaling method for scaling an image data into a first ratio image data and a second ratio image data and sharing a line buffer memory apparatus. The method comprises: providing a vertical accumulated value, a horizontal accumulated value, a first vertical scaling parameter, a first horizontal scaling parameter, a second vertical scaling parameter and a second horizontal scaling parameter; providing a first accumulated value and a second accumulated value respectively corresponding to the first vertical scaling parameter and the second vertical scaling parameter; providing a third accumulated value and a fourth accumulated value respectively corresponding to the first horizontal scaling parameter and the second horizontal scaling parameter; taking the horizontal accumulated value plus a horizontal preset value (generally, 1) as the horizontal accumulated value during each horizontal time; taking the third accumulated value plus the first horizontal scaling parameter as the third accumulated value when the horizontal accumulated value is equal to or greater than the third accumulated value; controlling the line buffer memory apparatus with the horizontal accumulated value to output a horizontal data corresponding to the horizontal accumulated value when the horizontal accumulated value is equal to the integer part of the third accumulated value; performing a first horizontal scaling operation on the horizontal data with the operation part of the third accumulated value; taking the fourth accumulated value plus the second horizontal scaling parameter as the fourth accumulated value when the horizontal accumulated value is greater than the fourth accumulated value; controlling the line buffer memory apparatus with the horizontal accumulated value to output a horizontal data corresponding to the horizontal accumulated value when the horizontal accumulated value is equal to the integer part of the fourth accumulated value; performing a second horizontal scaling operation on the horizontal data with the operation part of the fourth accumulated value; taking the vertical accumulated value plus a vertical preset value (generally, 1) as the vertical accumulated value, and setting the horizontal accumulated value, the third accumulated value and the fourth accumulated value to have an initial value when the horizontal accumulated value is equal to or greater than a horizontal predetermined value (generally, the horizontal width of an input image); taking the first accumulate value plus the first vertical scaling parameter as the first accumulated value when the vertical accumulated value is equal to or greater than the first accumulated value; controlling the line buffer memory apparatus to receive a scan line data corresponding to the vertical accumulated value when the vertical accumulated value is equal to the integer part of the first accumulated value; performing a first vertical scaling operation on the scan line data with the operation part of the first accumulated value; taking the second accumulated value plus the second vertical scaling parameter as the second accumulated value when the vertical accumulated value is equal to or greater than the second accumulated value; controlling the line buffer memory apparatus to receive a scan line data corresponding to the vertical accumulated value when the vertical accumulated value is equal to the integer part of the second accumulated value; and performing a second vertical scaling operation on the scan line data with the operation part of the second accumulated value.

As a plurality of scaling circuits shares the same line buffer memory apparatus in the present invention, an image can be scaled into images with at least two ratios at a low cost. Moreover, the circuit board layout may be simplified and the occurrence of interference may be reduced.

In order to make the aforementioned and other objectives, features and advantages of the present invention comprehensible, preferred embodiments accompanied with figures are described in detail below.

BRIEF DESCRIPTION OF THE DRAWINGS

FIGS. 3A-3J are schematic views of scaled-up images according to an embodiment of the present invention.

DESCRIPTION OF EMBODIMENTS

Figure 1:
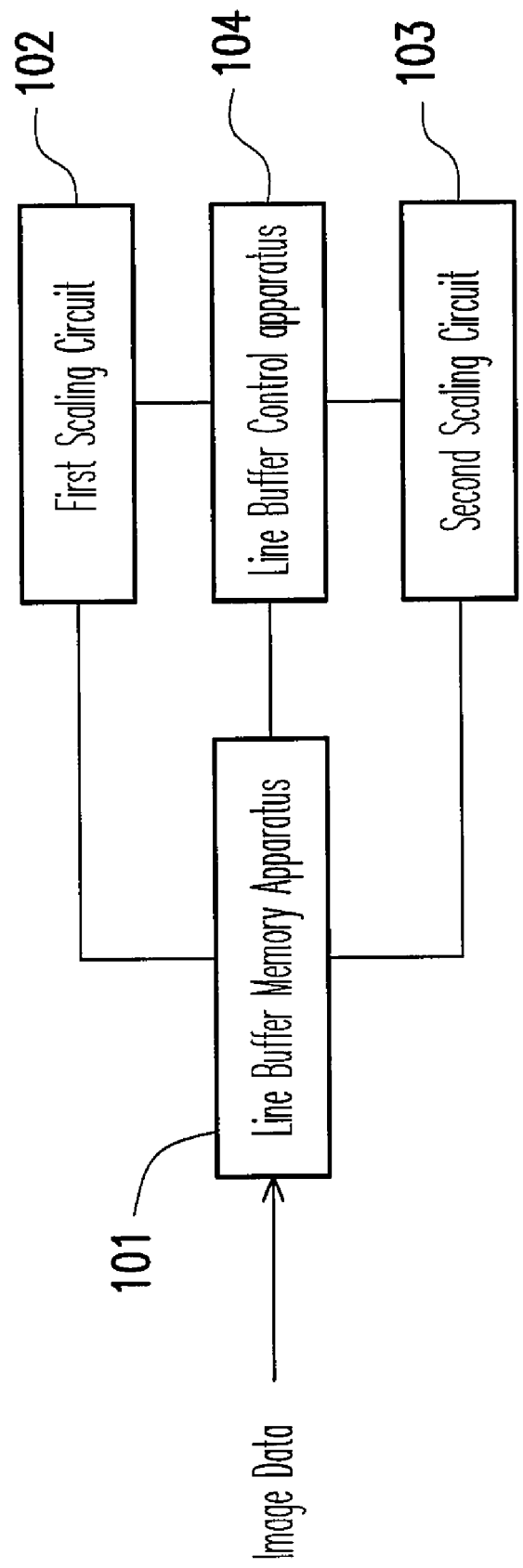
FIG. 1 is a circuit diagram of an image scaling circuit according to an embodiment of the present invention.

FIG. 1 is a circuit diagram of an image scaling circuit according to an embodiment of the present invention. Referring to FIG. 1, the circuit includes a line buffer memory apparatus 101, a first scaling circuit 102, a second scaling circuit 103 and a line buffer control apparatus 104. The first scaling circuit 102 is coupled to the line buffer memory apparatus 101, and performs a first image scaling interpolation operation on the data output by the line buffer memory apparatus 101. The second scaling circuit 103 is coupled to the line buffer memory apparatus 101, and performs a second image scaling interpolation operation on the data output by the line buffer memory apparatus 101. The line buffer control apparatus 104 is coupled to the line buffer memory apparatus 101, the first scaling circuit 102 and the second scaling circuit 103, for controlling the line buffer memory apparatus 101 to receive or output a scan line data according to the operation status of the first scaling circuit 102 and the second scaling circuit 103.

Figure 2:
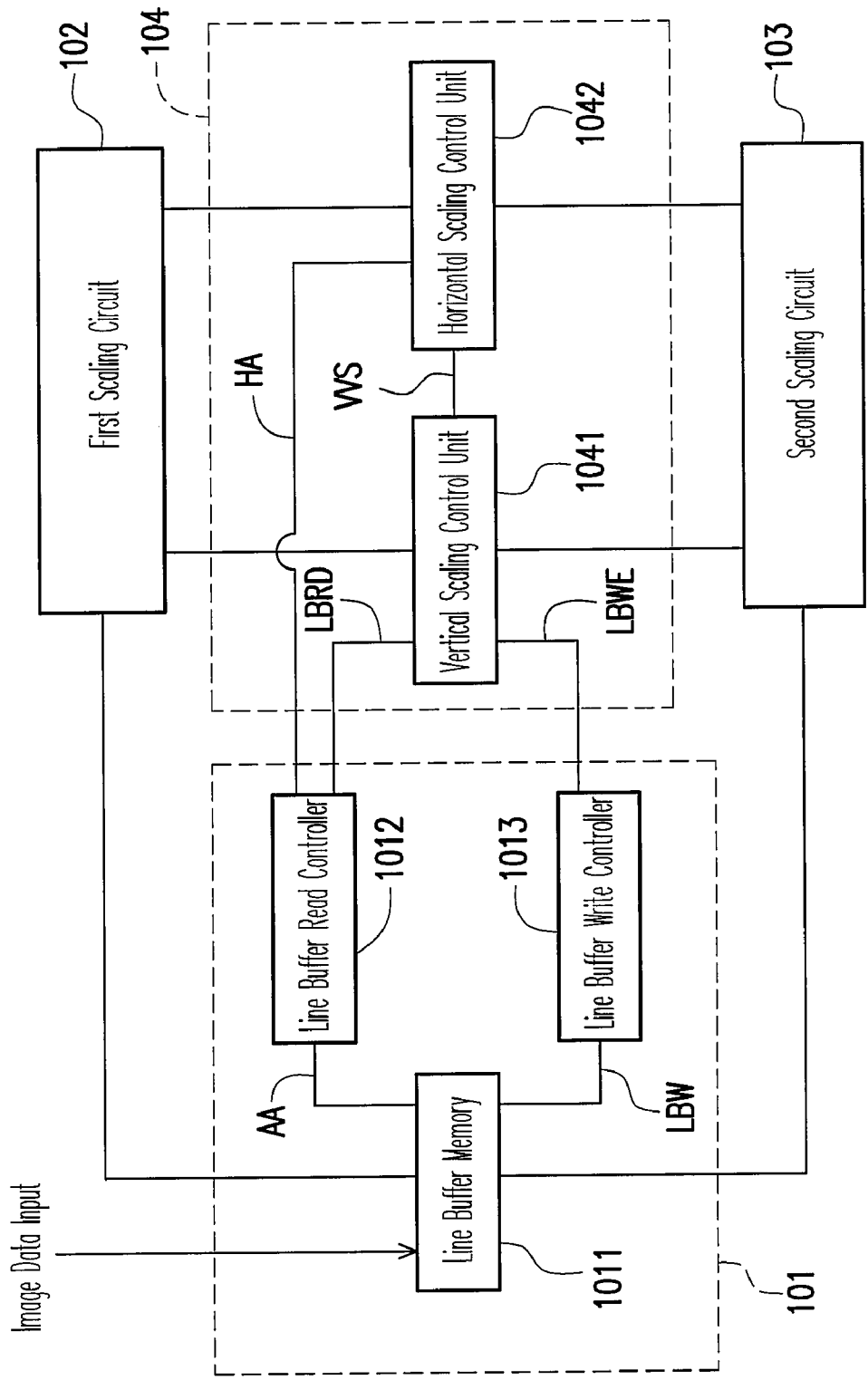
FIG. 2 is a circuit diagram of further implementation of the image scaling circuit in FIG. 1.

FIG. 2 is a circuit diagram of further implementation of the image scaling circuit in FIG. 1. Referring to FIG. 2, in this embodiment, a detailed implementation circuit of the line buffer control apparatus 104 and a detailed implementation circuit of the line buffer memory apparatus 101 are further shown in the circuit. The line buffer control apparatus 104 includes a vertical scaling control unit 1041 and a horizontal scaling control unit 1042. The line buffer memory apparatus 101 includes a line buffer memory 1011, a line buffer read controller 1012 and a line buffer write controller 1013.

To facilitate illustrating the operation of the above circuit, an operation of scaling up the same image into images with two different resolutions is first taken as an example. FIGS. 3A-3I are schematic views of scaling images implemented according to an embodiment of the present invention, which are described with reference to the circuit architecture in FIG. 2. Referring to FIGS. 3A-3I, in these schematic views, each Δ represents a source pixel, and each □ and ○ respectively stand for a first target pixel and a second target pixel. Here, it is assumed that a source frame is a frame of 5×5. In this embodiment, the frame of 5×5 is scaled up into a frame of 9×9 and a frame of 17×17. Additionally, a first horizontal scaling parameter is defined as (5−1)/(9−1)=0.5, a second horizontal scaling parameter as (5−1)/(17−1)=0.25, a first vertical scaling parameter as (5−1)/(9−1)=0.5, and a second vertical scaling parameter as (5−1)/(17−1)=0.25. Furthermore, a first accumulated value and a second accumulated value are defined by the vertical scaling control unit 1041 in the line buffer control apparatus 104, and a third accumulated value and a fourth accumulated value are defined by the horizontal scaling control unit 1042.

Although, for the convenience of illustration, frames of 5×5, 17×17 and 9×9 are taken as examples in this embodiment, those skilled in the art should understand that various resolutions defined by VESA standard, such as VGA, SVGA, XVGA, SXVGA, WXGA, are usually adopted in general applications. For example, if a VGA resolution (640×480) is to be scaled up into an SXVGA resolution (1280×1024), the horizontal scaling parameter may be (640−1)/(1280−1)=0.4996 and the vertical scaling parameter may be (480−1)/(1024)=0.4677. Therefore, the present invention is not limited herein.

Figure 3A:
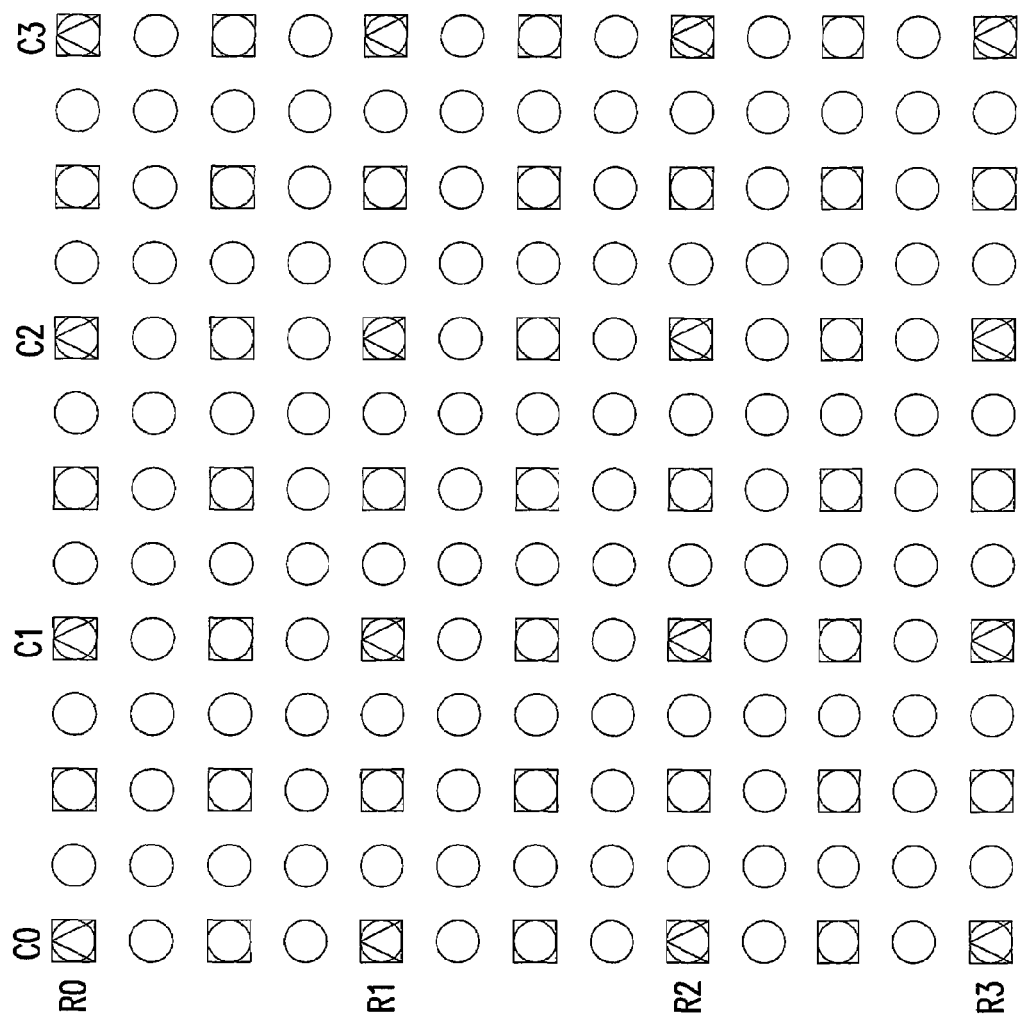

Initially, the above-mentioned first accumulated value, second accumulated value, third accumulated value and fourth accumulated value are set to have an initial value (for example, 0), and a first scan line data and a second scan line data are stored in advance in the line buffer memory 1011 (in this embodiment, the first and second scan line data are Δ portions of R0 and R1 in FIG. 3A). A line buffer read input image data completion signal LBRD is first received by the vertical scaling control unit 1041 in the line buffer control apparatus 104, and a vertical accumulated value is added to a vertical preset value (1). Next, the first accumulated value (0) plus the first vertical scaling parameter (0.5) is taken as the first accumulated value (0.5), and the operation part (0) of the first accumulated value is output to the first scaling circuit 102. Meanwhile, the second accumulated value (0) plus the second vertical scaling parameter (0.25) is taken as the second accumulated value (0.25), the operation part (0) of the second accumulated value is output to the second scaling circuit 103, and a vertical valid signal VVS is output.

After the vertical valid signal VVS is received by the horizontal scaling control unit 1042, a horizontal preset value (1) is added to the horizontal accumulated value. Then, the third accumulated value (0) plus the first horizontal scaling parameter (0.5) is taken as the third accumulated value (0.5). The accumulation operation is repeated until the third accumulated value is equal to or greater than the horizontal accumulated value (1), and the operation parts (0, 0.5) of the third accumulated value are output. Likewise, the fourth accumulated value (0) plus the second horizontal scaling parameter (0.25) is taken as the fourth accumulated value (0.25). The accumulation operation is repeated until the fourth accumulated value is equal to or greater than the horizontal accumulated value (1), and the operation parts (0, 0.25, 0.5, 0.75) of the fourth accumulated value are output. There after, the horizontal accumulated value HA is output to the line buffer read controller 1012 according to the integer parts (0) of the third and fourth accumulated values. The line buffer read controller 1012 takes an accumulated address value AA set therein plus the horizontal accumulated value HA as the accumulated address value AA, and outputs the accumulated address value AA to the line buffer memory 1011 so as to make the line buffer memory 1101 output pixels Δ(R0, C0), Δ(R0, C1), Δ(R1, C0) and Δ(R1, C1).

Figure 3B:
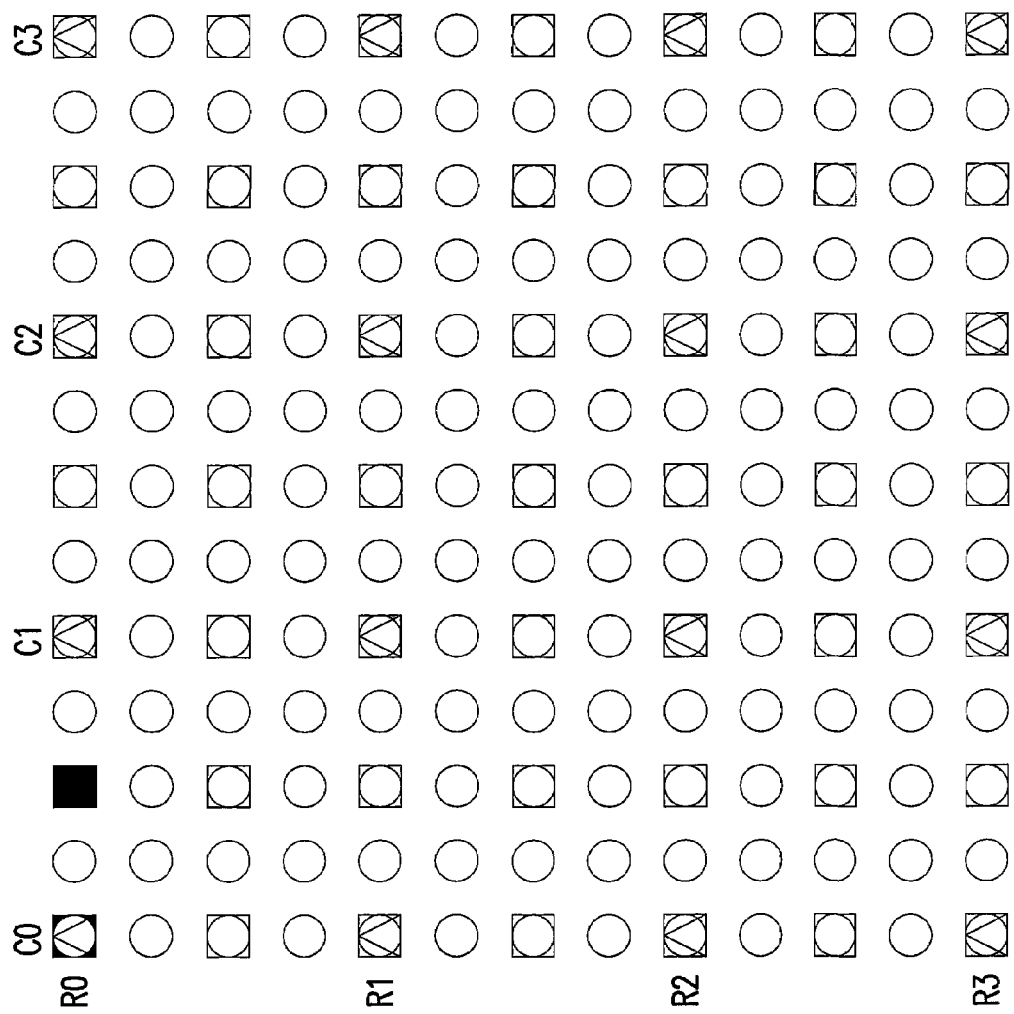

Next, the first scaling circuit 102 performs an interpolation operation on the pixels Δ(R0, C0), Δ(R0, C1), Δ(R1, C0) and Δ(R1, C1) according to the operation part (0) of the first accumulated value and the operation parts (0, 0.5) of the third accumulated value, thereby obtaining pixels □(R0, C0) and □(R0, C0.5) as shown in FIG. 3B, wherein the interpolation operation is, for example, the value of the pixel Δ(R0, C0)×(1−0.5)+the value of the pixel Δ(R0, C1)×0.5, so as to obtain □(R0, C0.5). Accordingly, the rest of the pixels can be inferred and deduced by those skilled in the art.

Figure 3C:
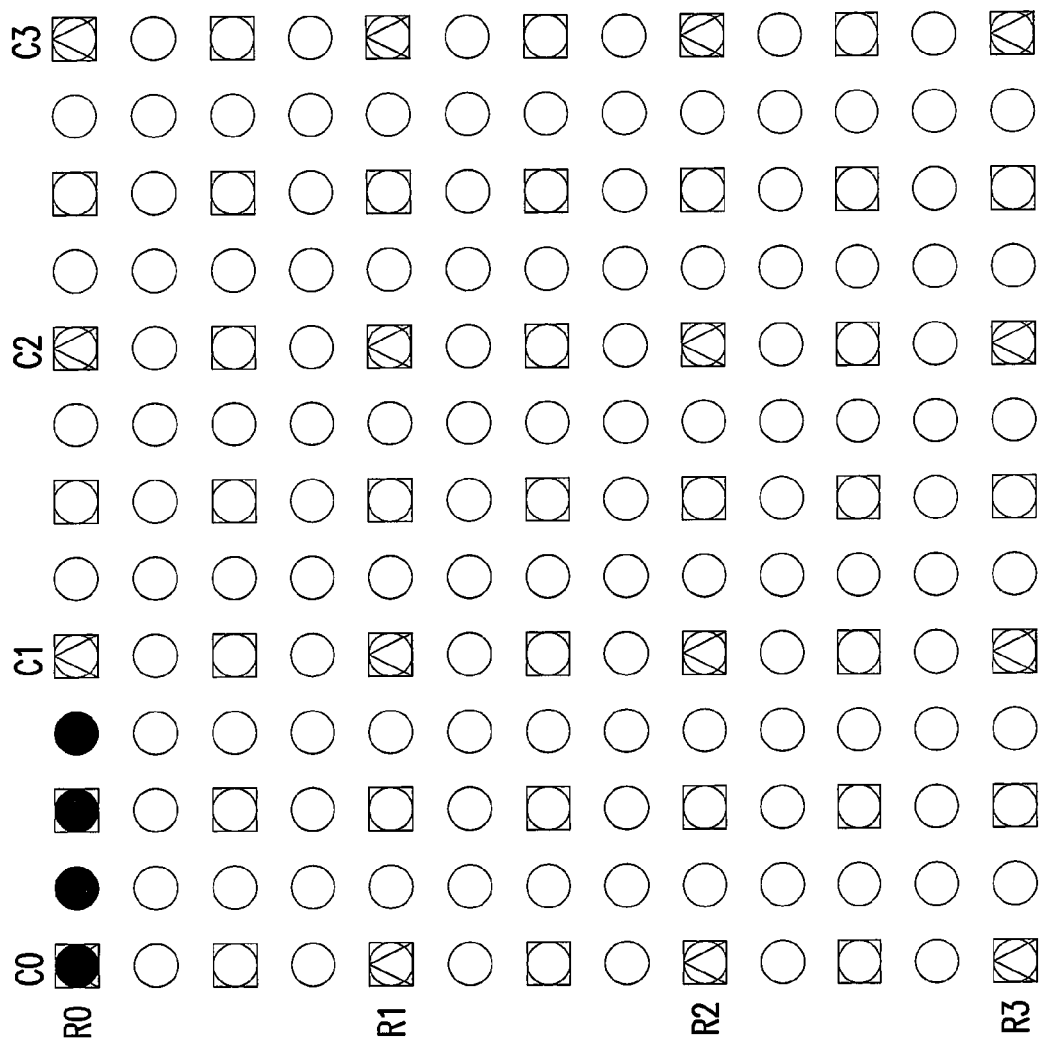

Likewise, the second scaling circuit 103 performs an interpolation operation on the pixels Δ(R0, C0), Δ(R0, C1), Δ(R1, C0) and Δ(R1, C1) according to the operation part (0) of the second accumulated value and the operation parts (0, 0.25, 0.5, 0.75) of the fourth accumulated value, thereby obtaining pixels ○(R0, C0), ○(R0, C0.25), ○(R0, C0.5) and ○(R0, C0.75) as shown in FIG. 3C, wherein the interpolation operation is, for example, the value of the pixel Δ(R0, C0)×(1−0.25)+the value of the pixel Δ(R0, C1)×0.25, so as to obtain the pixel ○(R0, C0.25). Accordingly, the rest of the pixels can be inferred and deduced by those skilled in the art.

Figure 3D:
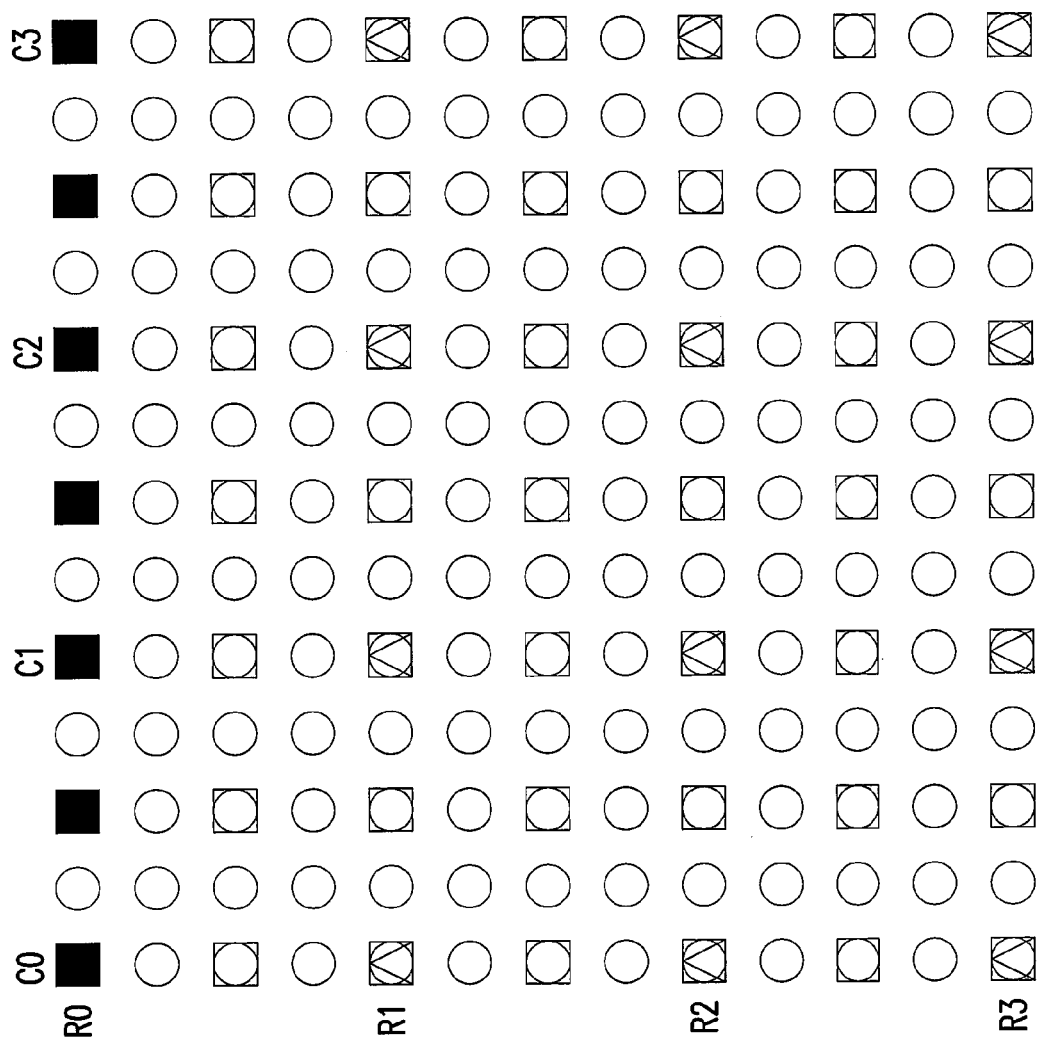
Figure 3E:
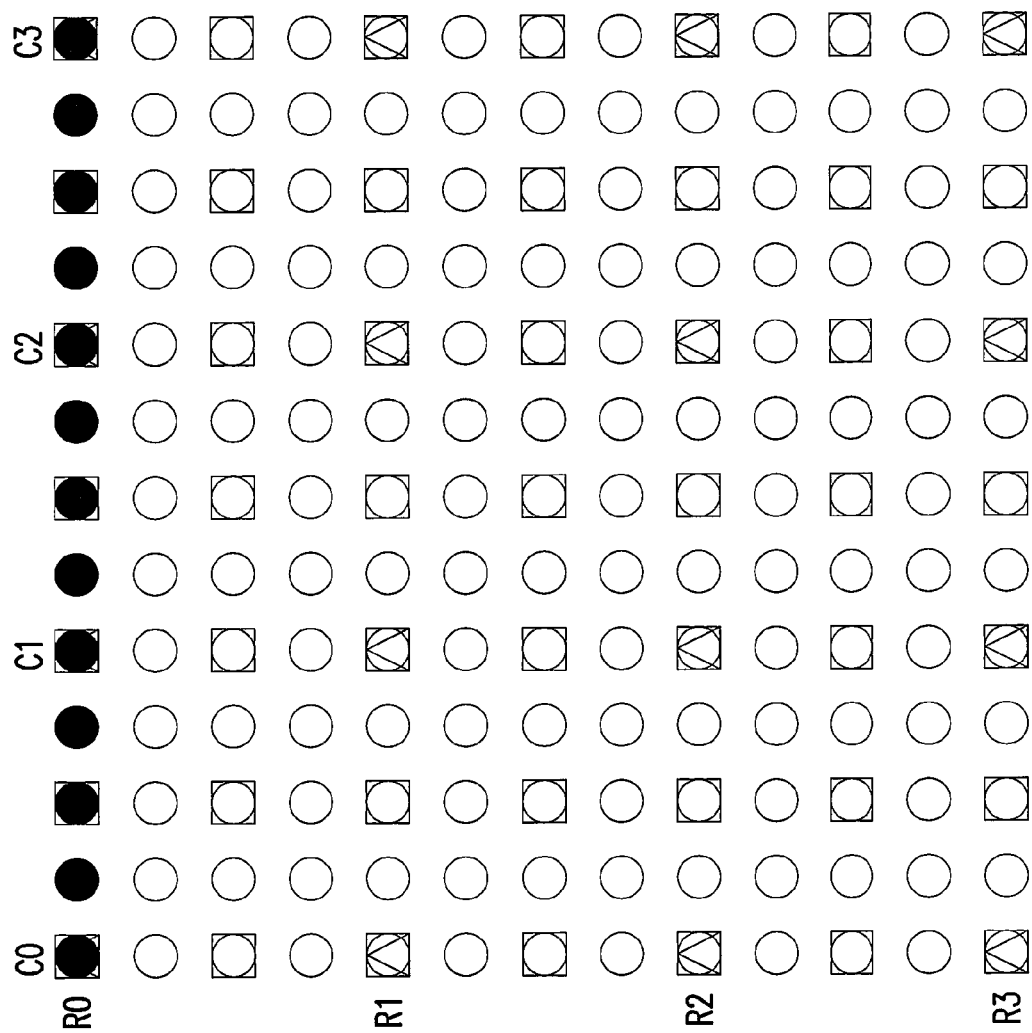

After a preset period of time which is enough for the first and second scaling circuits 102 and 103 to complete the operations, the preset time is determined, for example, by a clock signal or by a counter disposed in the horizontal scaling control unit 1042, i.e., the next preset time after the repeated accumulation operation until the third and fourth accumulated values are equal to or greater than the horizontal accumulated value (1). During the next preset time, the horizontal scaling control unit 1042 takes the third accumulated value (0.5) plus the first horizontal scaling parameter (0.5) as a new third accumulated value (1), takes the fourth accumulated value (0.75) plus the horizontal scaling parameter (0.25) as a new fourth accumulated value (1), takes the horizontal accumulated value (1) plus the horizontal preset value (1) as a new horizontal accumulated value, and then outputs the horizontal accumulated value HA to the line buffer read controller 1012. The line buffer read controller 1012 takes an accumulated address value AA set therein plus the horizontal accumulated value HA as the accumulated address value AA, and outputs the accumulated address value AA to the line buffer memory 1011 so as to make the line buffer memory 1011 output pixels Δ(R0, C2) and Δ(R1, C2). Likewise, the first scaling circuit continues to output pixels □(R0, C1) and □(R0, C1.5), the second scaling circuit continues to output pixels ○(R0, C1), ○(R0, C1.25), ○(R0, C1.5) and ○(R0, C1.75), and the rest can be deduced accordingly until the integer parts (4) of the third and fourth accumulated values are the same as a horizontal predetermined value (generally, the horizontal width of an input image), as shown in FIGS. 3D and 3E.

At this time, the accumulated address value AA obtained after the horizontal accumulated value HA is accumulated by the line buffer read controller 1012 exceeds a preset value set therein. Then, the line buffer read controller 1012 outputs the line buffer read end signal LBRD to the vertical scaling control unit 1041 and enables the signal LBRD, sets the accumulated address value AA to have an initial value (for example, 0) and sets the third accumulated value, the fourth accumulated value and the horizontal accumulated value to have an initial value (for example, 0).

After the line buffer read end signal LBRD is received by the vertical scaling control unit 1041, the first accumulated value (now, 0.5) plus the first vertical scaling parameter (0.5) is taken as the first accumulated value (1), and the operation part (0.5) of the first accumulated value is output to the first scaling circuit 102; the second accumulated value (now, 0.25) plus the second vertical scaling parameter (0.25) is taken as the second accumulated value (0.5), and the operation part (0.25) of the second accumulated value is output to the second scaling circuit 103; and, the vertical valid signal VVS is output.

Figure 3F:
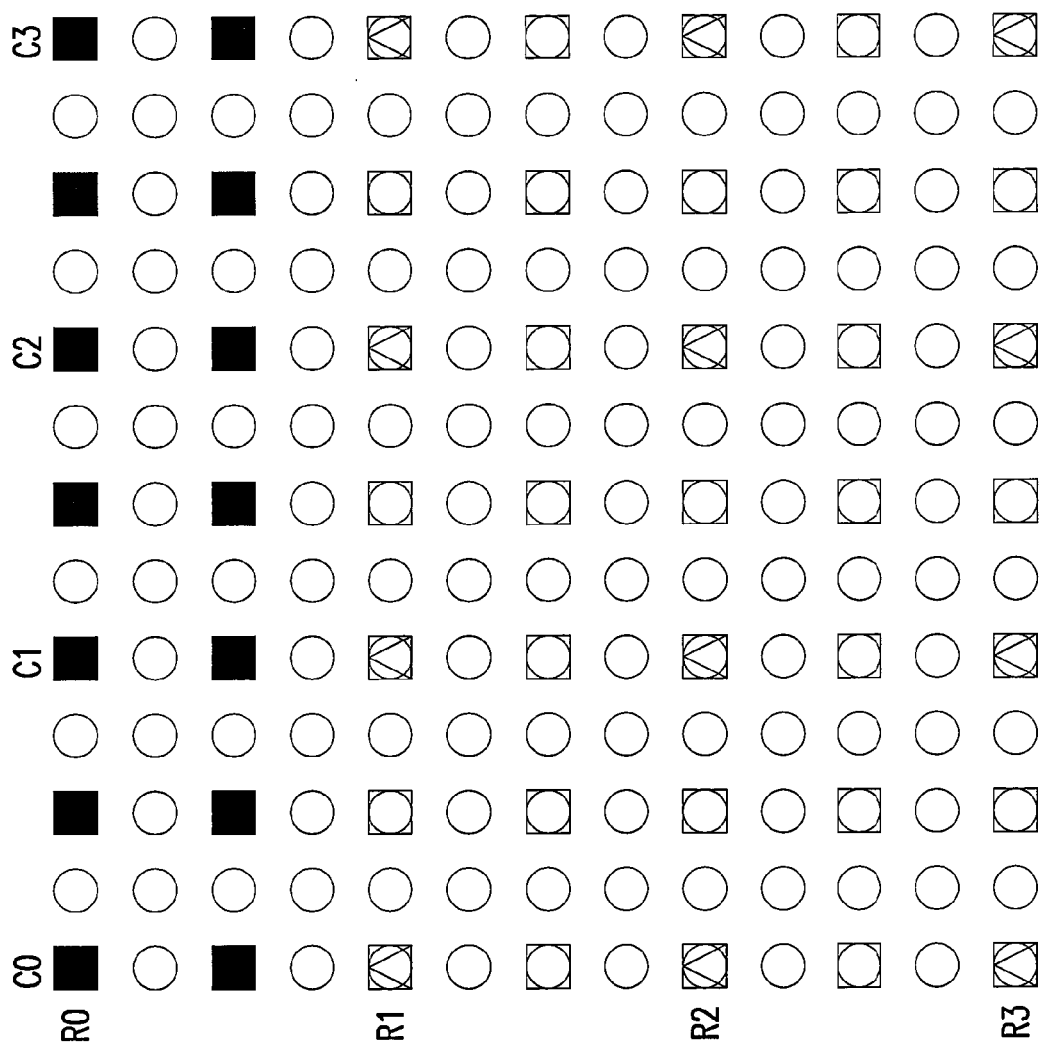
Figure 3G:
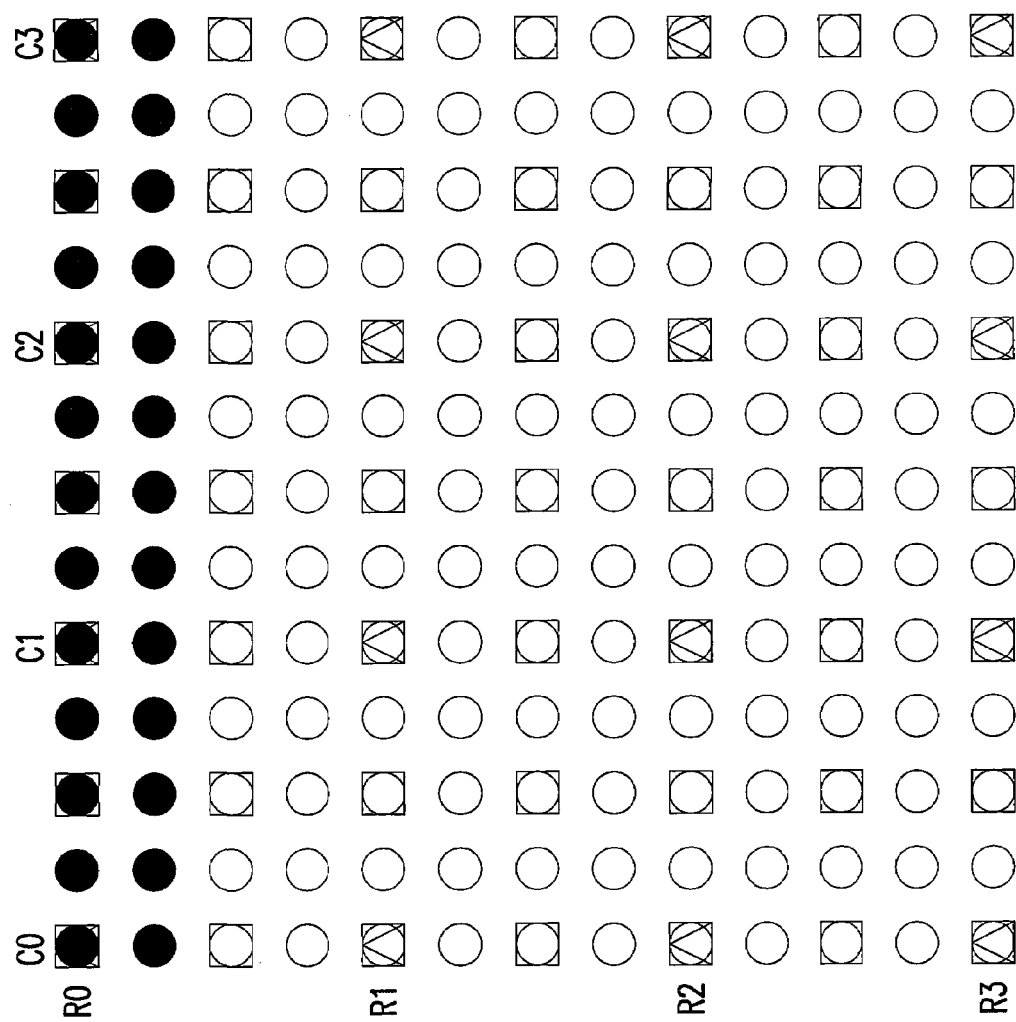

After the vertical valid signal VVS is received by the horizontal scaling control unit 1042, the aforementioned accumulation operation is repeated on the third and fourth accumulated values, and the operation parts of the first, second, third and fourth accumulated values are output to the first scaling circuit 102 and the second scaling circuit 103, such that the first scaling circuit 102 and the second scaling circuit 103 perform interpolation operations on pixels $\Delta(R0, Cn)$, n=0-3 of the first horizontal data of an input image and on pixels $\Delta(R1, Cn)$, n=0-3 of the second horizontal data of an input image, as shown in FIGS. 3F and 3G.

Next, the first scaling circuit 102 and the second scaling circuit 103 begin the aforementioned operations until the above accumulated address value AA exceeds the preset value in the line buffer read controller 1012 (i.e., when the operations on a row of pixels are completed). After the line buffer read end signal LBRD received by the vertical scaling control unit 1041 is enabled, the vertical scaling control unit 1041 begins to determine whether the integer part of the first accumulated value (1) is greater than that of the second accumulated value (0.5). When the integer part of the first accumulated value (1) is determined to be greater than that of the second accumulated value (0.5), the accumulation on the first accumulated value is stopped, the second accumulated value (0.5) plus the second vertical scaling parameter (0.25) is taken as the second accumulated value (0.75), and the operation part (0.5) of the second accumulated value is output to the second scaling circuit 103 for the above-mentioned interpolation operation.

Figure 3H:
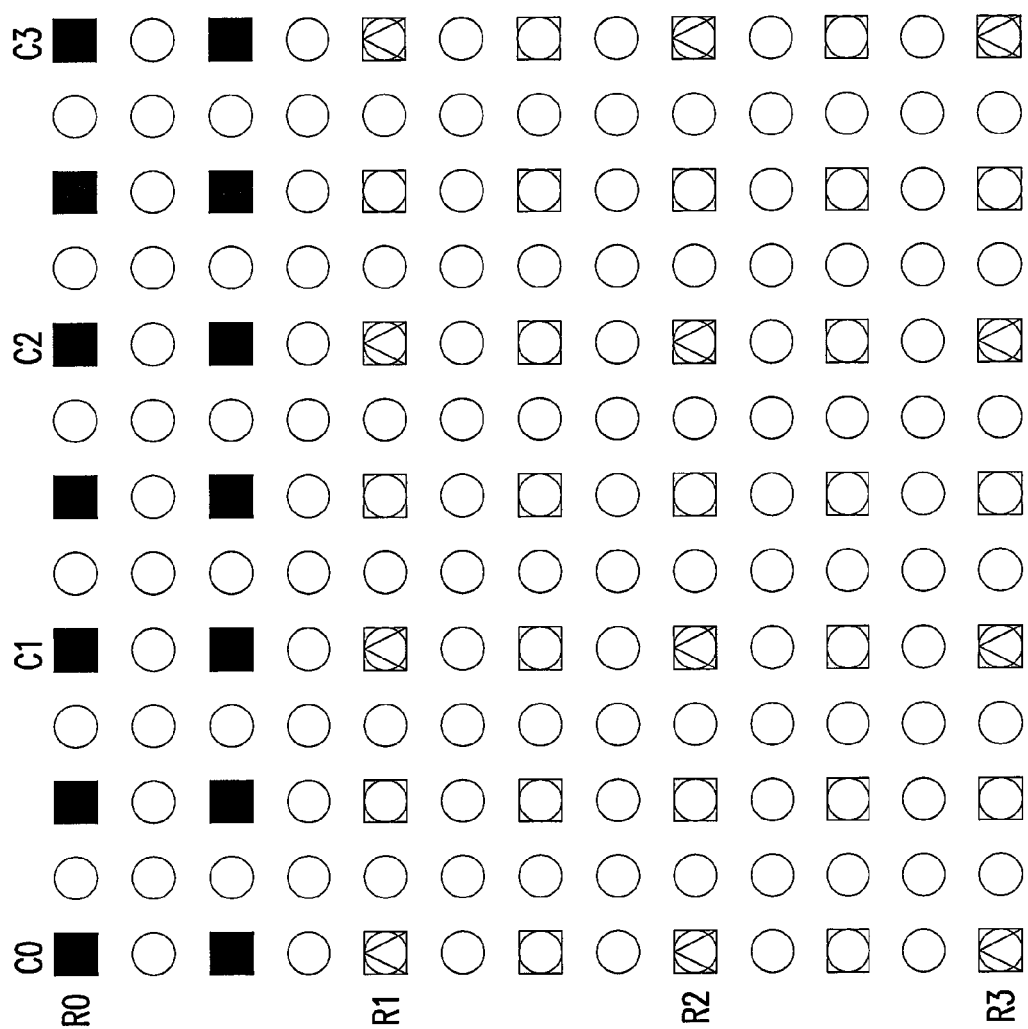
Figure 31:
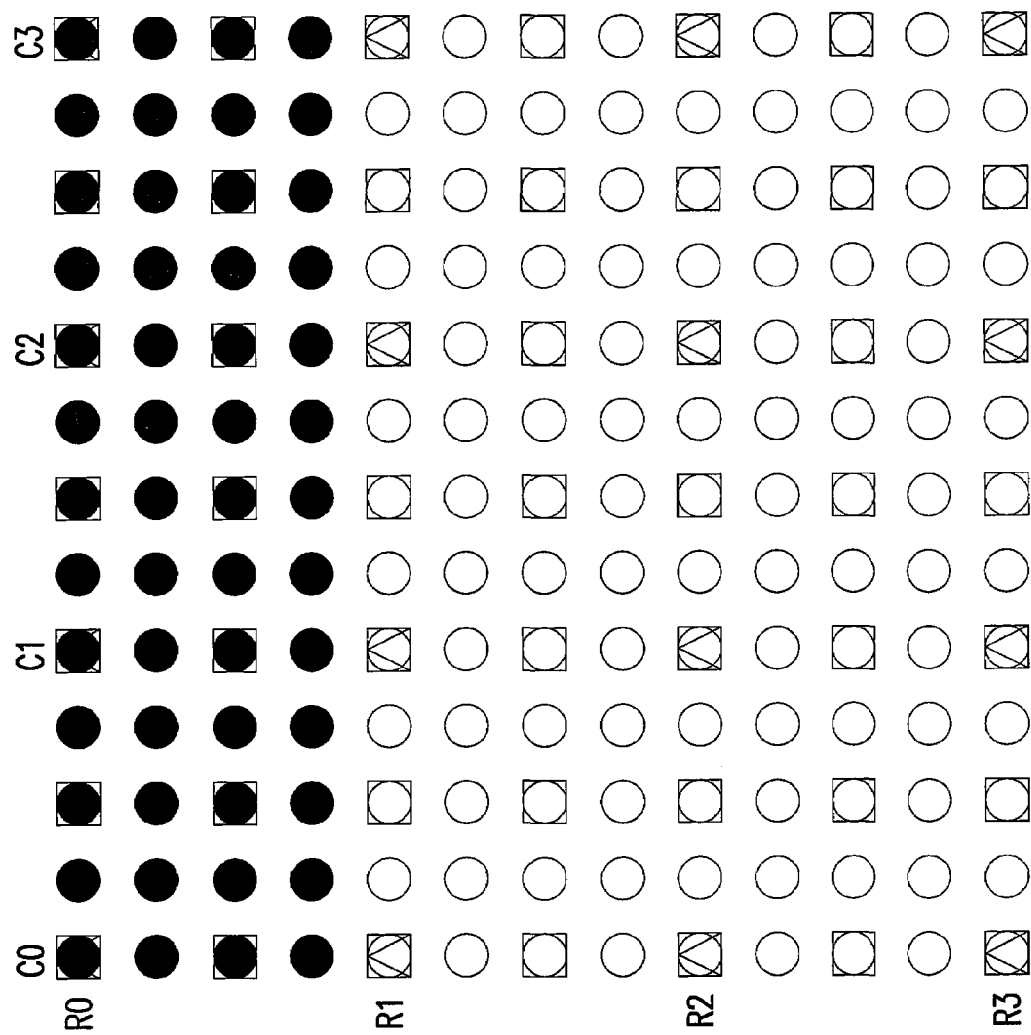
Figure 3J:
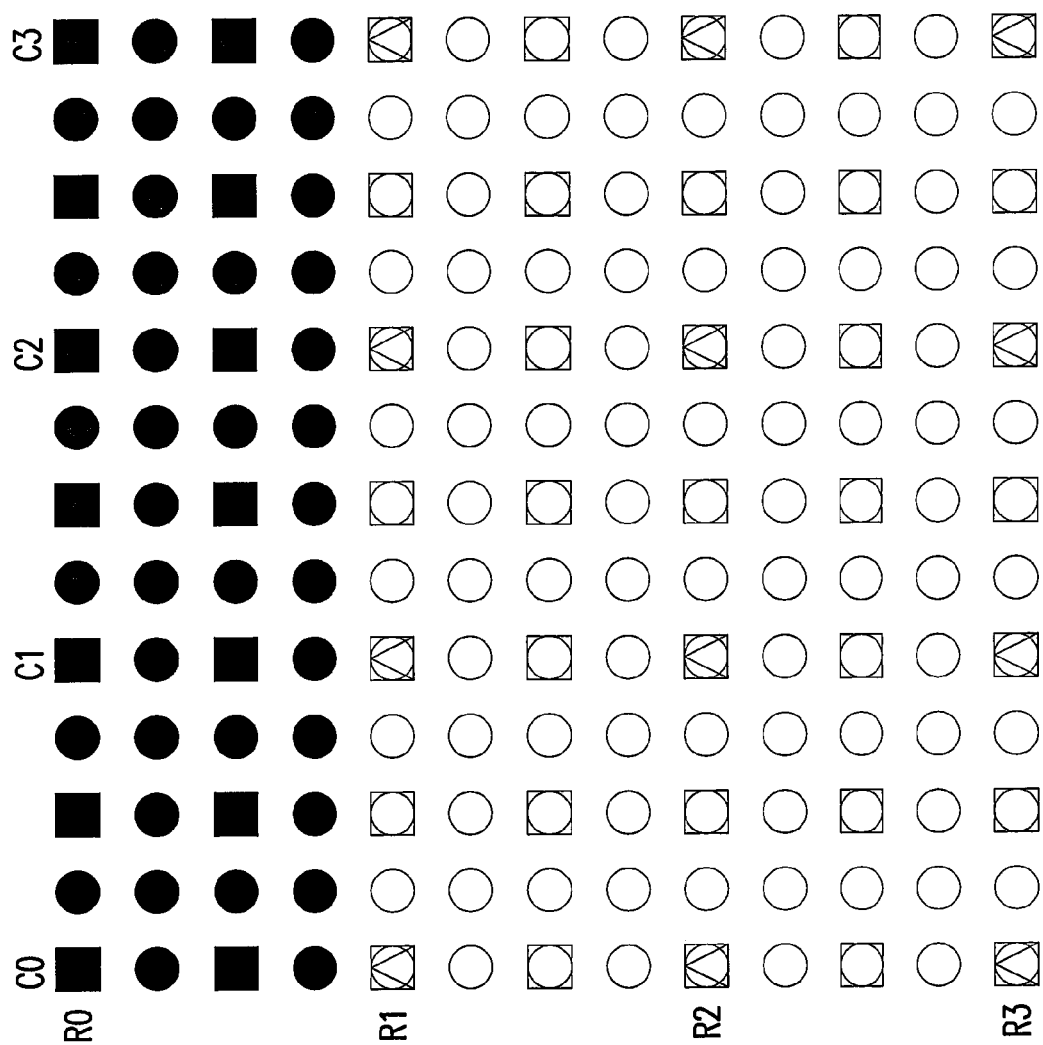

The above-mentioned accumulation operation is repeated until the second accumulated value (1) is equal to or greater than the integer part of the first accumulated value (1). At this time, the pixels output by the first scaling circuit 102 are maintained at the state as shown in FIG. 3H. When the operation part of the second accumulated value under the process of the second scaling circuit 103 is equal to 0.75 and meanwhile the line buffer read end signal LERD is generated, the vertical scaling control unit 1041 outputs and enables the line buffer write enable signal LBWE. The line buffer write controller 1013 receives the line buffer write enable signal LBWE, outputs and enables a line buffer write signal LBW. The line buffer memory 1011 receives the generated line buffer write signal LBW, erases a first scan line data $\Delta R0$ stored by the buffer memory, and receives a third scan line data $\Delta R2$. The pixels processed by the second scaling circuit 103 are maintained at the state as shown in FIG. 3I.

Next, the vertical scaling control unit 1041 continues to accumulate the first accumulated value (up to 1.5) and the second accumulated value (up to 1.25), and outputs the corresponding operation parts thereof (0 and 0) to the first scaling circuit 102 and the second scaling circuit 103, so as to repeat the aforementioned interpolation operations on the second scan line data $\Delta R1$ and the third scan line data $\Delta R2$. By repeating the above operations, a frame data $\Delta$ can be respectively scaled up into a frame data with a ratio of ○ and a frame data with a ratio of □.

Figure 4A:
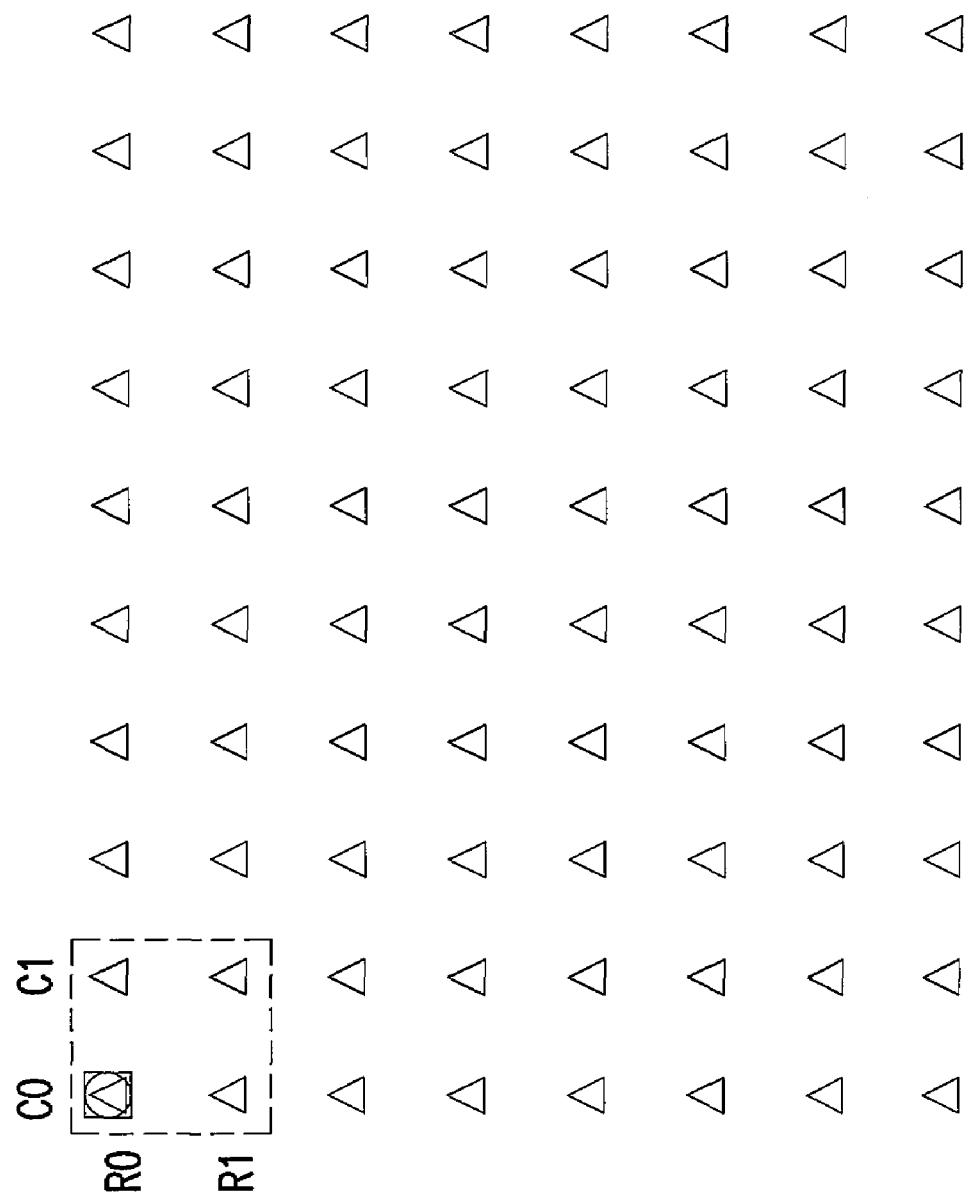
FIGS. 4A-4F are schematic views of scaled-down images according to an embodiment of the present invention.
Figure 4B:
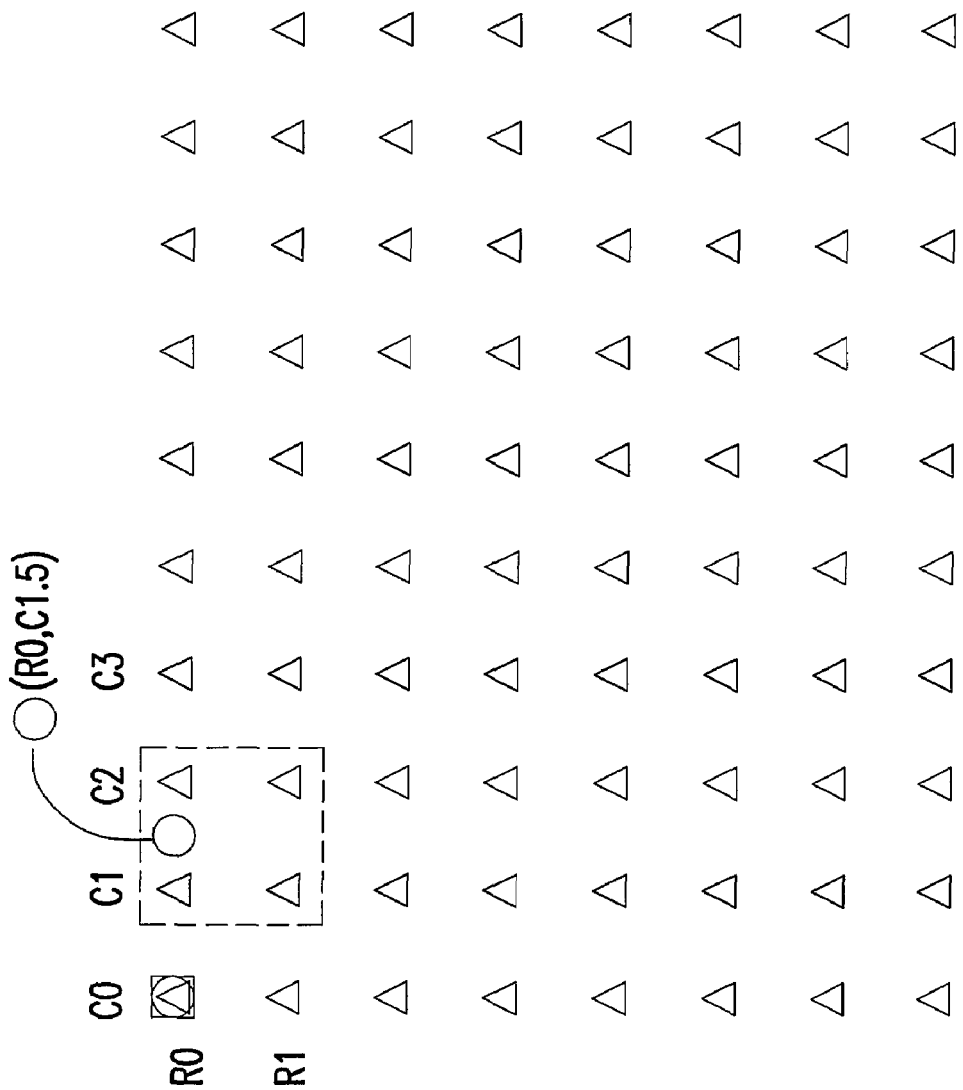
Figure 4C:
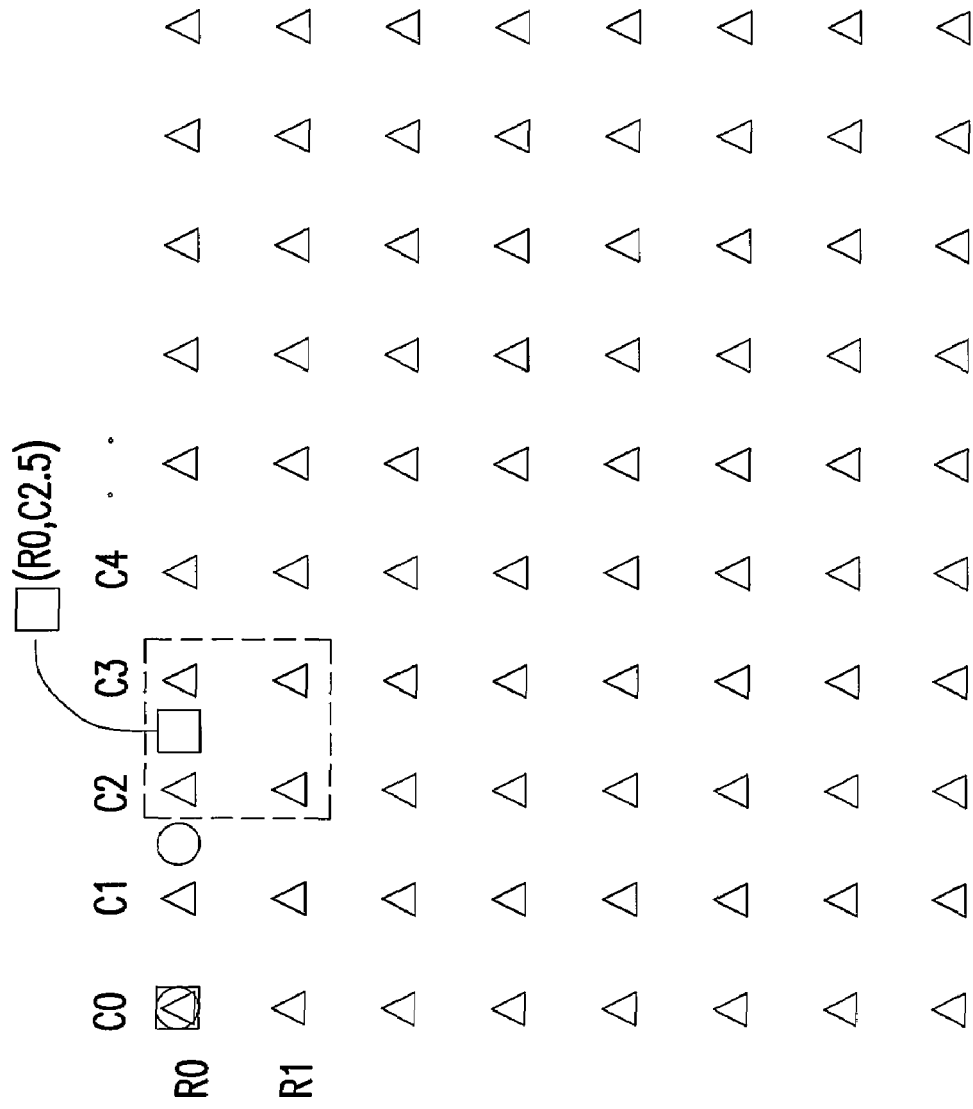
Figure 4D:
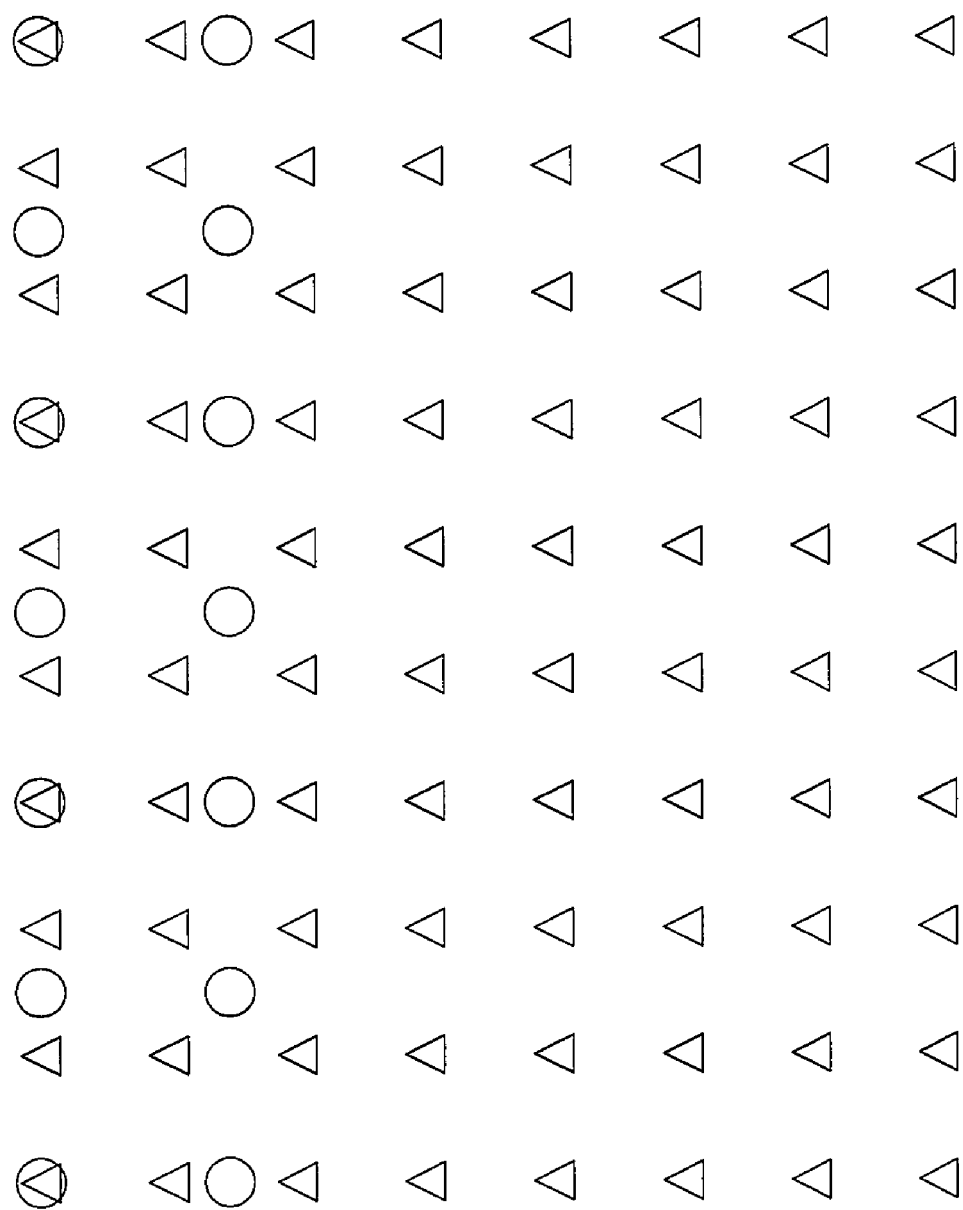
Figure 4E:
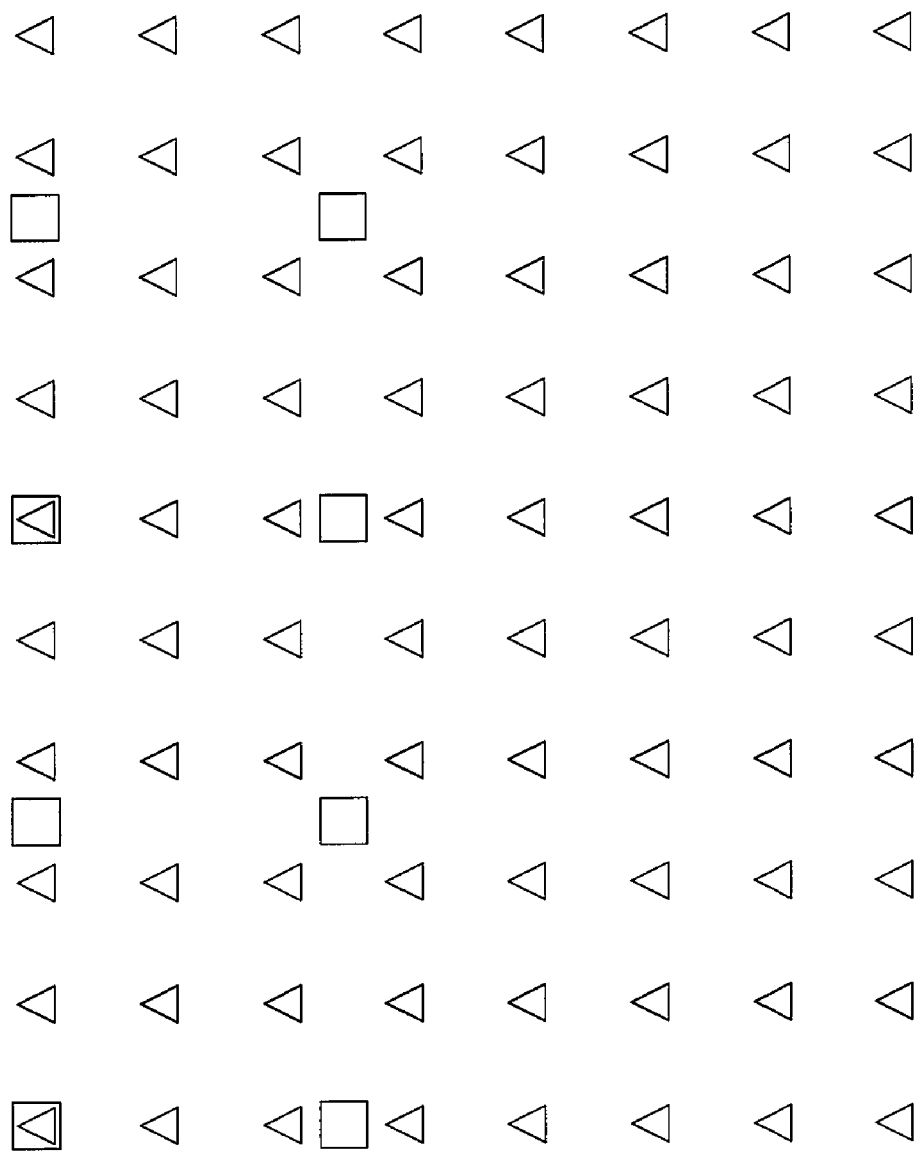
Figure 4F:
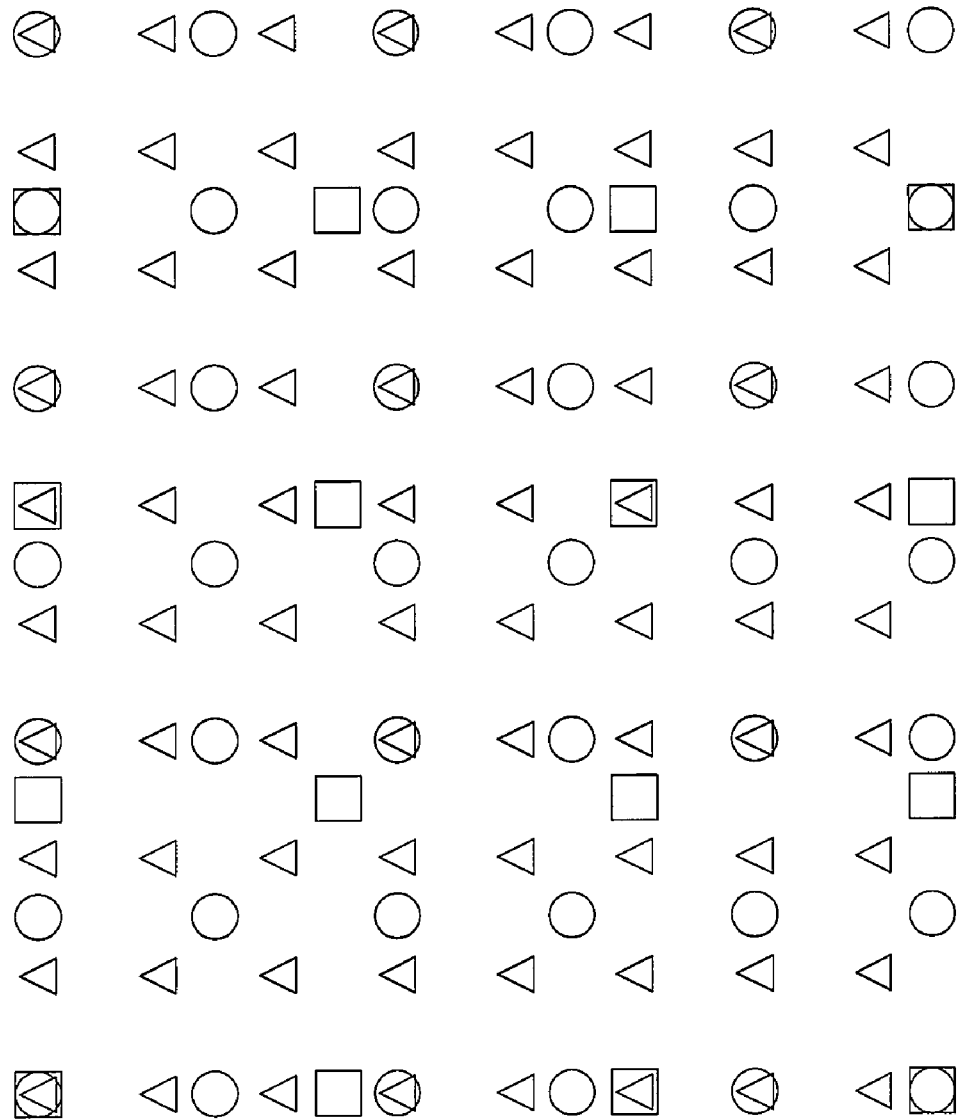
Figure 5:
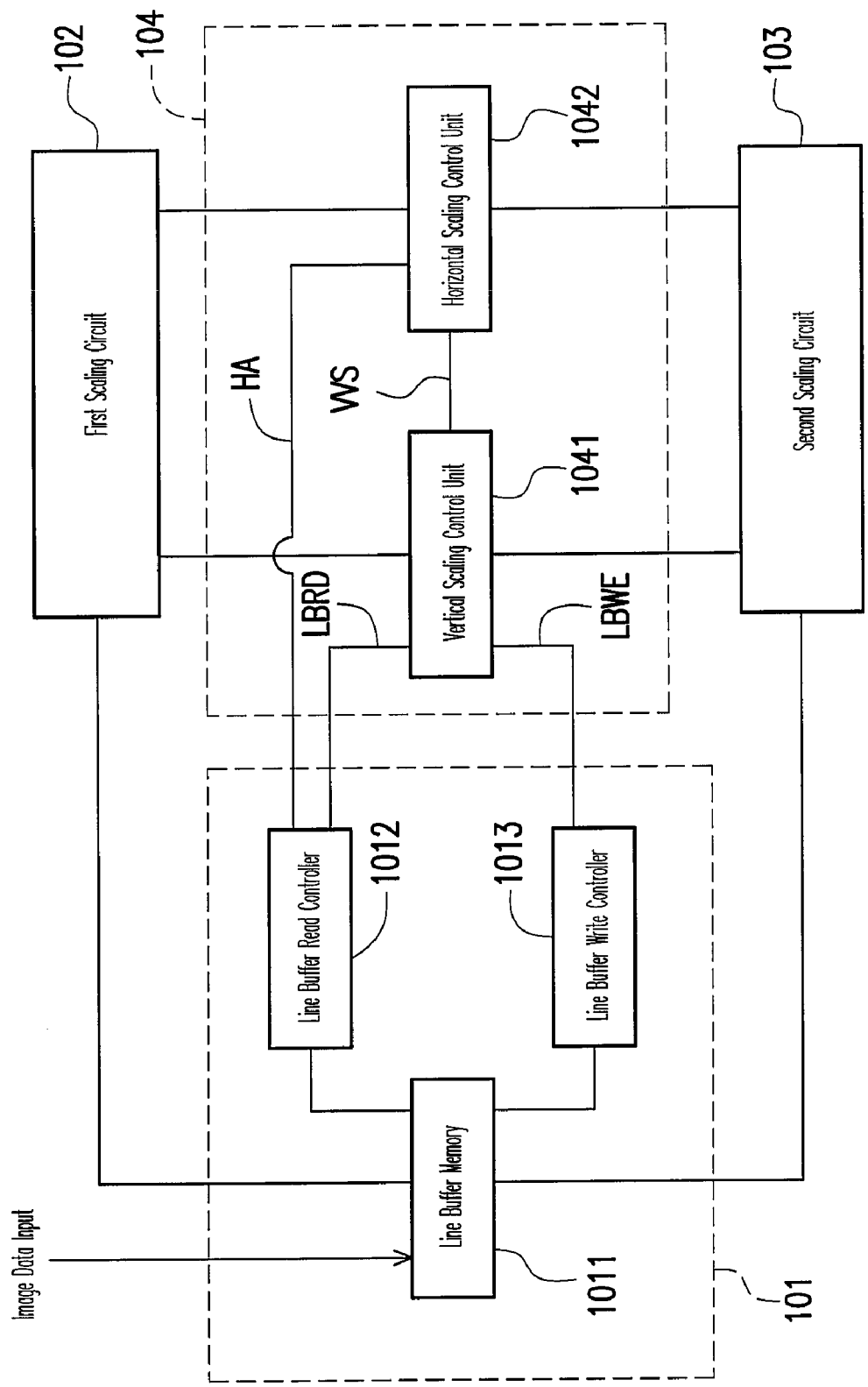
FIG. 5 is a circuit diagram of further implementation of the image scaling circuit in FIG. 1.

The above embodiment of scaling up an original frame data $\Delta$ into a frame data with a ratio of ○ and a frame data with a ratio of □ is taken as an example. Next, in an example shown by FIGS. 4A-4F, with the same hardware apparatus, an embodiment of scaling down a frame data $\Delta$ into a frame data with a ratio of ○ and a frame data with a ratio of □ is adopted. The circuit in FIG. 5 is referred to for the convenience of illustrating this embodiment. The basic architecture of the circuit in FIG. 5 is identical to that in FIG. 2, but is slightly different in operation. FIGS. 5 and 4A are used for illustration below.

Referring to FIG. 4A, it is assumed that a source frame is a frame of 16×16. In this embodiment, the frame of 16×16 is to be scaled down into a frame of 11×11 and a frame of 7×7. Additionally, here, a first horizontal scaling parameter is defined as (16−1)/(11−1)=1.5, a second horizontal scaling is defined as (16−1)/(7−1)=2.5, a first vertical scaling parameter is defined as (16−1)/(11−1)=1.5, and a second vertical scaling parameter is defined as (16−1)/(7−1)=2.5. Furthermore, a vertical accumulated value, a first accumulated value and a second accumulated value are defined by the vertical scaling control unit 1041 in the line buffer control apparatus 104, and a horizontal accumulated value, a third accumulated value and a fourth accumulated value are defined by the horizontal scaling control unit 1042.

Initially, the above first accumulated value, second accumulated value, third accumulated value and fourth accumulated value are set to have an initial value (for example, 0), and a first and second scan line data are stored in advance in the line buffer memory 1011 (in this embodiment, the first and second scan line data are $\Delta$ portions of R0 and R1 in FIG. 4A). After a line buffer read input image data completion signal LBRD is received by the vertical scaling control unit 1041 in the line buffer control apparatus 104, the operation part (0) of the first accumulated value and the operation part (0) of the second accumulated value are output to the first scaling circuit 102 and the second scaling circuit 103, and a vertical valid signal VVS is output.

After the vertical valid signal VVS is received by the horizontal scaling unit 1042, the operation part (0) of the third accumulated value and the operation part (0) of the fourth accumulated value are output to the first scaling circuit 102 and the second scaling circuit 103, and a horizontal accumulated value HA is output to the line buffer read controller 1012. According to the horizontal accumulated value HA, the line buffer read controller controls a line buffer read memory to output horizontal data $\Delta(R0, C0)$, $\Delta(R0, C1)$, $\Delta(R1, C0)$ and $\Delta(R1, C1)$ to the first scaling circuit 102 and the second scaling circuit 103. The first scaling circuit 102 performs an interpolation operation according to the horizontal data $\Delta(R0, C0)$, $\Delta(R0, C1)$, $\Delta(R1, C0)$, $\Delta(R1, C1)$ and the operation parts of the first and third accumulated values, thereby obtaining ○(R0, C0). The second scaling circuit 103 performs an interpolation operation according to the horizontal data $\Delta(R0, C0)$, $\Delta(R0, C1)$, $\Delta(R1, C0)$, $\Delta(R1, C1)$ and the operation parts of the second and fourth accumulated values, thereby obtaining □(R0, C0).

Next, the horizontal scaling control unit 1042 takes the horizontal accumulated value plus a horizontal preset value (in this embodiment, 1) as the horizontal accumulated value HA (now, the horizontal accumulated value HA is 1). Then, the horizontal scaling control unit 1042 determines whether the horizontal accumulated value (1) is equal to or greater than the third accumulated value (0) and the fourth accumulated value (0). After the horizontal accumulated value HA (1) is determined to be equal to or greater than the third accumulated value (0) and the fourth accumulated value (0), the horizontal scaling control unit 1042 begins to take the third accumulated value (0) plus the first horizontal scaling parameter (1.5) as the third accumulated value (1.5), the fourth accumulated value (0) plus the second horizontal scaling parameter (2.5) as the fourth accumulated value (2.5), and to output the operation parts (respectively 0.5 and 0.5) of the third and fourth accumulated values.

At this time, the horizontal scaling control unit 1042 determines whether the integer part of the horizontal accumulated value is equal to that of the third or fourth accumulated values. When the integer part of the horizontal accumulated value is determined to be equal to the third accumulated value, the horizontal scaling control unit 1042 outputs the horizontal accumulated value HA to the line buffer read controller 1012, and controls the line buffer read controller 1012 to output horizontal data Δ(R0, C1), Δ(R0, C2), Δ(R1, C1) and Δ(R1, C2) to the first scaling circuit 102 according to the horizontal accumulated value HA. The first scaling circuit 102 performs an interpolation operation according to the horizontal data Δ(R0, C1), Δ(R0, C2), Δ(R1, C1), Δ(R1, C2) and the operation parts (respectively 0 and 0.5) of the first and third accumulated values, thereby obtaining ◯(R0, C1.5), as shown in FIG. 4B.

Then, during the next horizontal time, the horizontal scaling control unit 1042 takes the horizontal accumulated value (now, 1) plus a horizontal preset value (1) as the horizontal accumulated value HA (now, the horizontal accumulated value HA is 2). Next, the horizontal scaling control unit 1042 determines whether the horizontal accumulated value (2) is equal to or greater than the third accumulated value (1.5) and the fourth accumulated value (2.5). After the horizontal accumulated value HA (2) is determined to be equal to or greater than the third accumulated value (1.5), the horizontal scaling control unit 1042 begins to take the third accumulated value (1.5) plus the first horizontal scaling parameter (1.5) as the third accumulated value (3) and output the operation part (0) of the third accumulated value.

Additionally, the horizontal scaling control unit 1042 determines whether the integer part of the horizontal accumulated value is equal to that of the third or fourth accumulated value. When the horizontal accumulated value (2) is determined to be equal to the integer part of the fourth accumulated value (2.5), the horizontal scaling control unit 1042 outputs the horizontal accumulated value HA to the line buffer read controller 1012, and controls the line buffer read controller 1012 to output horizontal data Δ(R0, C2), Δ(R0, C3), Δ(R1, C2) and Δ(R1, C3) to the second scaling circuit 103 according to the horizontal accumulated value HA. The second scaling circuit 103 performs an interpolation operation according to the horizontal data Δ(R0, C2), Δ(R0, C3), Δ(R1, C2), Δ(R1, C3) and the operation parts (respectively 0 and 0.5) of the second and fourth accumulated values, thereby obtaining □(R0, C2.5), as shown in FIG. 4C.

Afterward, the above-mentioned operations are repeated by the horizontal scaling control unit 1042 until the horizontal accumulated value HA is equal to or greater than a horizontal preset value (for example, 15 in this embodiment, i.e., the last point of the horizontal width of an input image in general). At this time, the line buffer read controller 1012 outputs the line buffer read end signal LBRD. After the line buffer read end signal LBRD is received by the vertical scaling control unit 1041, the vertical accumulated value plus a vertical preset value (for example 1) is taken as the vertical accumulated value, and the vertical accumulated value (1) is compared with the first accumulated value and the second accumulated value, wherein when the first accumulated value (0) is found equal to or smaller than the vertical accumulated value (1), the first accumulated value (0) plus the first vertical scaling parameter is taken as the first accumulated value (1.5), while when the second accumulated value (0) is found equal to or smaller than the vertical accumulated value (1), the second accumulated value (0) plus the second vertical scaling parameter (2.5) is taken as the second accumulated value (2.5).

Next, the vertical scaling control unit 1041 begins to compare the vertical accumulated value (1) with the integer parts of the first accumulated value (1.5) and the second accumulated value (2.5). When the vertical accumulated value (1) is found equal to the integer part of the first accumulated value (1.5), the vertical scaling control unit 1041 outputs the operation part (0.5) of the first accumulated value to the first scaling circuit 102, and outputs a line buffer write signal LBW. Then, according to the line buffer write signal LBW, the line buffer write controller 1013 controls the line buffer memory 1011 to receive a scan line data R3 (which is written in advance into a vertical line of the next input image to the line buffer memory for an effective operation). Finally, the vertical scaling control unit 1041 outputs a vertical valid signal VVS for controlling the horizontal scaling control unit 1042 to start using horizontal scan lines R1 and R2 to calculate ◯(R1.5, C0), ◯(R1.5, C1.5)–◯(R1.5, C15) during each horizontal time, as shown in FIG. 4D.

Similarly, after the operations are completed, the horizontal accumulated value HA output by the horizontal scaling control unit 1042 is equal to or greater than a horizontal preset value (for example, 15), and the line buffer read controller 1012 determines that the horizontal accumulated value HA is equal to or greater than a horizontal threshold value. As such, the line buffer read end signal LBRD is first output, and then the horizontal accumulated value, the third accumulated value and the fourth accumulated value are set to have an initial value ( for example, 0). After the line buffer read end signal LBRD is received by the vertical scaling control unit 1041, the vertical accumulated value (1) plus a vertical preset value (1) is taken as the vertical accumulated value (2), and the vertical accumulated value (2) is compared with the first accumulated value (1.5) and the second accumulated value (2.5), wherein when the integer part (1) of the first accumulated value is found smaller than the vertical accumulated value (2), the first accumulated value (1.5) plus the first vertical scaling parameter (1.5) is taken as the first accumulated value (3).

Thereafter, the vertical scaling control unit 1041 begins to compare the vertical accumulated value (2) with the integer parts of the first accumulated value (3) and the second accumulated value (2.5). When the vertical accumulated value (2) is found equal to the integer part of the second accumulated value (2.5), the vertical scaling control unit 1041 outputs the operation part (0.5) of the first accumulated value to the second scaling circuit 102, and outputs a line buffer write signal LBW. Then, according to the line buffer write signal LBW, the line buffer write controller 1013 controls the line buffer memory 1011 to receive a scan line data R4. Finally, the vertical scaling control unit 1041 outputs a vertical valid signal VVS for controlling the horizontal scaling control unit 1042 to start using horizontal scan lines R2 and R3 to calculate □(R2.5, C0), □(R2.5, C2.5)–□(R2.5, C15) during each horizontal time, as shown in FIG. 4E. Afterward, the above interpolation operations are repeated to achieve the results as shown in FIG. 4F.

It is apparent to those skilled in the art that the implementation of the aforementioned embodiment can be an operation for scaling down one frame into frames with two different ratios, as shown in FIG. 4, or can be a scaling-up operation and a scaling-down operation performed simultaneously on the same frame. Moreover, the above operation may be a little different depending on the scaling algorithm (which is not limited to the interpolation operation). As the spirit of the present invention is to scale the same image into images with different ratios and share a line buffer memory apparatus, the present invention is not limited to the above embodiment. Further, it is apparent to those skilled in the art that, in addition to the above embodiment wherein the operations are performed first horizontally and then vertically, an equivalent implementation of performing the operations first vertically and then horizontally according to the spirit of the present invention is also applicable, and thus the present invention is not limited herein.

Figure 6:
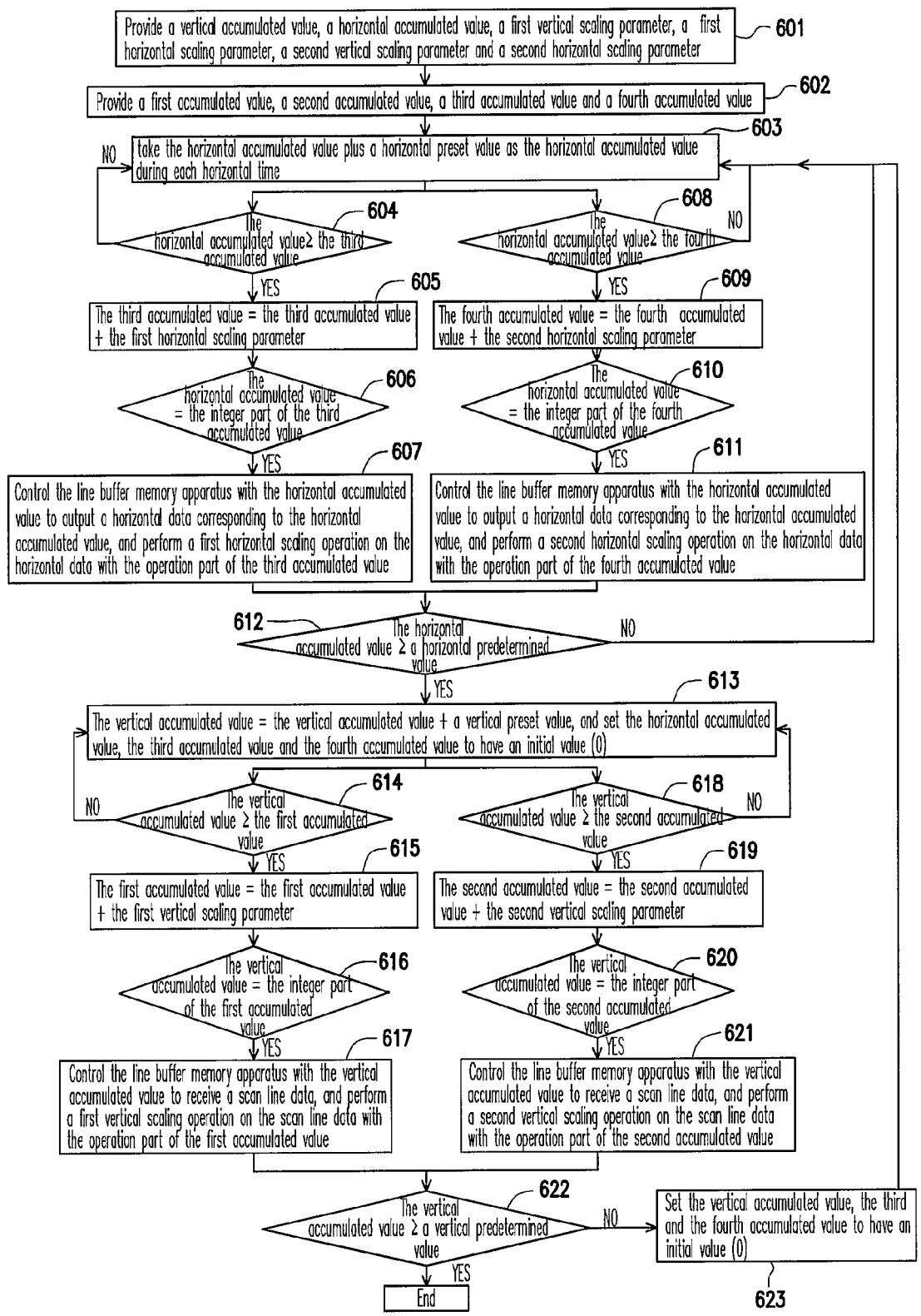
FIG. 6 is a flow chart of an image scaling method according to an embodiment of the present invention.

FIG. 6 is an image scaling method according to an embodiment of the present invention. The method is mainly used to scale an image data into a first ratio image data and a second ratio image data and share a line buffer memory apparatus.

Referring to FIG. 6, first, a vertical accumulated value, a horizontal accumulated value, a first vertical scaling parameter, a first horizontal scaling parameter, a second vertical scaling parameter and a second horizontal scaling parameter are provided (Step 601). Next, a first accumulated value, a second accumulated value, a third accumulated value and a fourth accumulated value are provided respectively corresponding to the first vertical scaling parameter, the second vertical scaling parameter, the first horizontal scaling parameter and the second horizontal scaling parameter (Step 602). During each horizontal time, the horizontal accumulated value plus a horizontal preset value is taken as the horizontal accumulated value (Step 603).

Next, whether the horizontal accumulated value is equal to or greater than the third accumulated value is determined (Step 604). When the horizontal accumulated value is determined to be equal to or greater than the third accumulated value, the third accumulated value plus the first horizontal scaling parameter is taken as the third accumulated value (Step 605). Then, whether the horizontal accumulated value is equal to the integer part of the third accumulated value is determined (Step 606). When the horizontal accumulated value is determined to be equal to the integer part of the third accumulated value, the line buffer memory apparatus is controlled by the horizontal accumulated value to output a horizontal data corresponding to the horizontal accumulated value, and a first horizontal scaling operation is performed on the horizontal data with the operation part of the third accumulated value (Step 607).

In another flow, whether the horizontal accumulated value is equal to or greater than the fourth accumulated value is determined (Step 608). When the horizontal accumulated value is determined to be equal to or greater than the fourth accumulated value, the fourth accumulated value plus the second horizontal scaling parameter is taken as the fourth accumulated value (Step 609). Next, whether the horizontal accumulated value is equal to the integer part of the fourth accumulated value is determined (Step 610). When the horizontal accumulated value is determined to be equal to the integer part of the fourth accumulated value, the line buffer memory apparatus is controlled by the horizontal accumulated value to output a horizontal data corresponding to the horizontal accumulated value, and a second horizontal scaling operation is performed on the above horizontal data with the operation part of the fourth accumulated value (Step 611).

After Steps 604-607, or after Steps 608-611, whether the horizontal accumulated value is equal to or greater than a horizontal preset value, i.e., a threshold value is determined (Step 612). If yes, the vertical accumulated plus a vertical preset value is taken as the vertical accumulated value, and the horizontal accumulated value, the third accumulated value and the fourth accumulated value are set to have an initial value (for example, 0) (Step 613). Next, whether the vertical accumulated value is equal to or greater than the first accumulated value is determined (Step 614). If yes, the first accumulated value plus the first vertical scaling parameter is taken as the first accumulated value (Step 615). Then, whether the vertical accumulated value is equal to or greater than the integer part of the first accumulated value is determined (Step 616). If yes, the line buffer memory apparatus is controlled to receive a scan line data corresponding to the vertical accumulated value, and a first vertical scaling operation is performed on the scan line data with the operation part of the first accumulated value (Step 617).

In another aspect, whether the vertical accumulated value is equal to or greater than the second accumulated value is determined (Step 618). If yes, the second accumulated value plus the second vertical scaling parameter is taken as the second accumulated value (Step 619). Then, whether the vertical accumulated value is equal to the integer part of the second accumulated value is determined (Step 620). If yes, the line buffer memory apparatus is controlled to receive a scan line data corresponding to the vertical accumulated value, and a second vertical scaling operation is performed on the scan line data with the operation part of the second accumulated value (Step 621).

After Steps 613-617, or after Steps 613-621, whether the vertical accumulated value is equal to or greater than a vertical predetermined value, i.e., a vertical threshold value (generally the vertical height of an input image) is determined (Step 622). If yes, the image scaling is completed. If no, the process returns to Step 603 and the above-mentioned steps are repeated until the image scaling is completed.

In view of the above, the present invention adopts the structure of a plurality of scaling circuits sharing the same line buffer memory apparatus, so as to achieve the purpose of scaling the same frame into frames with different ratios. Accordingly, an image can be scaled into images with at least two different ratios under a low cost. Furthermore, in the embodiments of the present invention, the quantity of the employed elements is reduced. Therefore, the difficulty on the circuit board layout can be alleviated and the occurrence of electromagnetic interference can be further reduced.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. An image scaling circuit, for scaling a source frame into a first ratio frame and a second ratio frame, the image scaling circuit comprising:

a line buffer memory apparatus, for receiving and temporally storing a scan line data, and outputting the scan line data;

a first scaling circuit, coupled to the line buffer memory apparatus, for receiving the scan line data, and performing a first image scaling interpolation operation on the scan line data;

a second scaling circuit, coupled to the line buffer memory apparatus, for receiving the scan line data, and performing a second image scaling interpolation operation on the scan line data; and a line buffer control apparatus, coupled to the line buffer memory apparatus, the first scaling circuit and the second scaling circuit, for controlling the line buffer memory apparatus to receive or output the scan line data according to the operation status of the first scaling circuit and the second scaling circuit.

2. The image scaling circuit as claimed in claim 1, wherein the line buffer control apparatus comprises:

a vertical scaling control unit, comprising a first vertical scaling parameter and a second vertical scaling parameter, for receiving a line buffer read end signal and outputting a vertical valid signal, wherein when the line buffer read end signal is enabled:

a first accumulated value plus the first vertical scaling parameter is taken as the first accumulated value, and an operation part of the first accumulated value is output;

a second accumulated value plus the second vertical scaling parameter is taken as the second accumulated value, and an operation part of the second accumulated value is output;

when an integer part of the first accumulated value is equal to or greater than that of the second accumulated value, upon the generation of the line buffer read end signal, the second accumulated value plus the second vertical scaling parameter is taken as the second accumulated value, and the operation part of the second accumulated value is output until the second accumulated value is equal to or greater than the integer part of the first accumulated value; and when the second accumulated value is equal to or greater than the integer part of the first accumulated value, and the line buffer read end signal is enabled:

the $(i-1)_{th}$ scan line data stored by the line buffer memory apparatus is erased;

the line buffer memory apparatus is controlled to receive the $(i+1)_{th}$ scan line data; and the vertical valid signal is enabled; and a horizontal scaling control unit, comprising a first horizontal scaling parameter and a second horizontal scaling parameter, coupled to the vertical scaling control unit, for receiving a vertical valid signal and outputting a horizontal accumulated value, wherein, during each of a plurality of preset time:

a third accumulated value plus the first horizontal scaling parameter is taken as the third accumulated value, and the operation part of the third accumulated value is output;

a fourth accumulated value plus the second horizontal scaling parameter is taken as the fourth accumulated value, and the operation part of the fourth accumulated value is output;

according to integer parts of the third accumulated value and the fourth accumulated value, the horizontal accumulated value is output to control the line buffer memory apparatus to output a data, and when the integer part of the third accumulated value is greater than that of the fourth accumulated value, the fourth accumulated value plus the second horizontal scaling parameter is taken as the fourth accumulated value;

wherein "i" is a natural number greater than 1.

3. The image scaling circuit as claimed in claim 2, wherein the first scaling circuit is coupled to the horizontal scaling control unit, the vertical scaling control unit and the line buffer memory apparatus, to perform the first image scaling interpolation operation on the scan line data according to the operation part of the first accumulated value and the operation part of the third accumulated value.

4. The image scaling circuit as claimed in claim 2, wherein the second scaling circuit is coupled to the horizontal scaling control unit, the vertical scaling control unit and the line buffer memory apparatus, to perform the second image scaling interpolation operation on the scan line data according to the operation part of the second accumulated value and the operation part of the fourth accumulated value.

5. The image scaling circuit as claimed in claim 2, wherein the line buffer memory apparatus comprises:

a line buffer read controller, coupled to the vertical scaling control unit, for receiving the horizontal accumulated value, and outputting the line buffer read end signal and an accumulated address value to take the accumulated address value plus the horizontal accumulated value as the accumulated address value, wherein when the accumulated address value is equal to or greater than a horizontal threshold value, the line buffer read end signal is enabled;

a line buffer write controller, coupled to the vertical scaling control unit, for receiving a line buffer write enable signal output by the vertical scaling control unit, and outputting a line buffer write signal, wherein the line buffer write signal is enabled when the line buffer write enable signal is enabled; and a line buffer memory, coupled to the line buffer read controller and the line buffer write controller, for receiving the accumulated address value and the line buffer write signal, and outputting a data stored by the line buffer memory according to the accumulated address value, wherein the $(i-1)_{th}$ scan line data stored by the line buffer memory is erased and the $(i+1)_{th}$ scan line data is received when the line buffer write signal is enabled;

wherein, when the second accumulated value of the vertical scaling control unit is equal to or greater than the integer part of the first accumulated value, and the line buffer read end signal is enabled, the line buffer write enable signal output by the vertical scaling control unit is enabled.

6. The image scaling circuit as claimed in claim 2, wherein an initial value of the first through the fourth accumulated values is 0.

7. The image scaling circuit as claimed in claim 2, wherein when the first scaling circuit performs a scaling-up operation, the operation part of the first accumulated value and the operation part of the third accumulated value are respectively the non-integer part of the first accumulated value and the non-integer part of the third accumulated value; if the non-integer part of the first accumulated value is 0, the operation part of the first accumulated value is 0; and if the non-integer part of the third accumulated value is 0, the operation part of the third accumulated value is 0.

8. The image scaling circuit as claimed in claim 7, wherein when the first scaling circuit performs a scaling-up operation, the first scaling parameter and the third scaling parameter are respectively smaller than 1.

9. The image scaling circuit as claimed in claim 2, wherein when the second scaling circuit performs a scaling-up operation, the operation part of the second accumulated value and the operation part of the fourth accumulated part are respectively a non-integer part of the second accumulated value and a non-integer part of the fourth accumulated value; if the non-integer part of the second accumulated value is 0, the operation part of the second accumulated value is 0; and if the non-integer part of the fourth accumulated value is 0, the operation part of the fourth accumulated value is 0.

10. The image scaling circuit as claimed in claim 9, wherein when the second scaling circuit performs a scaling-up operation, the second scaling parameter and the fourth scaling parameter are respectively smaller than 1.

11. The image scaling circuit as claimed in claim 1, wherein the line buffer control apparatus comprises:
a vertical scaling control unit, comprising a first accumulated value, a second accumulated value, a vertical accumulated value, a first vertical scaling parameter and a second vertical scaling parameter, for receiving a line buffer read end signal, and outputting a vertical valid signal and a line buffer write signal,
wherein when the line buffer read end signal is generated:
the vertical accumulated value plus a vertical preset value is taken as the vertical accumulated value;
the line buffer write signal is output to control the line buffer memory apparatus to receive a scan line data; and
the vertical valid signal is output;
wherein when the vertical accumulated value is equal to or greater than the first accumulated value, the first accumulated value plus the first vertical scaling parameter is taken as the first accumulated value;
wherein when the vertical accumulated value is equal to the integer part of the first accumulated value, the operation part of the first accumulated value is output;
wherein when the vertical accumulated value is equal to or great than the second accumulated value, the second accumulated value plus the second vertical scaling parameter is taken as the second accumulated value; and
wherein when the vertical accumulated value is equal to the integer part of the second accumulated value, the operation part of the second accumulated value is output; and
a horizontal scaling control unit, coupled to the vertical scaling control unit, comprising a first horizontal scaling parameter, a second horizontal scaling parameter, a horizontal accumulated value, a third accumulated value and a fourth accumulated value, for receiving the vertical valid signal, wherein during each horizontal time:
the horizontal accumulated value plus a horizontal preset value is taken as the horizontal accumulated value;
the horizontal accumulated value is output to control the line buffer memory apparatus to output a horizontal data corresponding to the horizontal accumulated value;
wherein when the horizontal accumulated value is equal to or greater than the third accumulated value, the third accumulated value plus the first horizontal scaling parameter is taken as the third accumulated value;
wherein when the horizontal accumulated value is equal to the integer part of the third accumulated value, the operation part of the third accumulated value is output;
wherein when the horizontal accumulated value is equal to or greater than the fourth accumulated value, the fourth accumulated value plus the second horizontal scaling parameter is taken as the fourth accumulated value; and
wherein when the horizontal accumulated value is equal to the integer part of the fourth accumulated value, the operation part of the fourth accumulated value is output.

12. The image scaling circuit as claimed in claim 11, wherein the line buffer memory apparatus comprises:
a line buffer memory;
a line buffer read controller, coupled to the vertical scaling control unit and the line buffer memory, for receiving the horizontal accumulated value, and outputting the line buffer read end signal to control the line buffer memory to output a horizontal data corresponding to the horizontal accumulated value, wherein when the horizontal accumulated value is equal to or greater than a horizontal threshold value, the line buffer read end signal is enabled, and
a line buffer write controller, coupled to the vertical scaling control unit, for receiving the vertical accumulated value output by the vertical scaling control unit to control the line buffer memory to receive the scan line data according to the vertical accumulated value.

13. The image scaling circuit as claimed in claim 11, wherein when the horizontal accumulated value is equal to or greater than a horizontal end value, the horizontal scaling control unit outputs a horizontal end control signal to control the vertical scaling control unit, such that the vertical scaling control unit controls the line buffer memory apparatus to receive the scan line data.

14. The image scaling circuit as claimed in claim 11, wherein the operation parts of the first, second, third and fourth accumulated values are respectively non-integer parts of the first, second, third and fourth accumulated values.

15. An image scaling method, for scaling a source frame into a first ratio frame and a second ratio frame by sharing a line buffer memory apparatus, the image scaling method comprising:
providing a vertical accumulated value, a horizontal accumulated value, a first vertical scaling parameter, a first horizontal scaling parameter, a second vertical scaling parameter and a second horizontal scaling parameter;
providing a first accumulated value and a second accumulated value respectively corresponding to the first vertical scaling parameter and the second vertical scaling parameter;
providing a third accumulated value and a fourth accumulated value respectively corresponding to the first horizontal scaling parameter and the second horizontal scaling parameter;
taking the horizontal accumulated value plus a horizontal preset value as the horizontal accumulated value during each of a plurality of horizontal time;
wherein when the horizontal accumulated value is equal to or greater than the third accumulated value, the third accumulated value plus the first horizontal scaling parameter is taken as the third accumulated value;
wherein when the horizontal accumulated value is equal to the integer part of the third accumulated value:
the line buffer memory apparatus is controlled by the horizontal accumulated value to output a horizontal data corresponding to the horizontal accumulated value; and
a first horizontal scaling operation is performed on the horizontal data using the operation part of the third accumulated value; and
wherein when the horizontal accumulated value is equal to or greater than the fourth accumulated value, the fourth accumulated value plus the second horizontal scaling parameter is taken as the fourth accumulated value;
wherein when the horizontal accumulated value is equal to the integer part of the fourth accumulated value:
the line buffer memory apparatus is controlled by the horizontal accumulated value to output a horizontal data corresponding to the horizontal accumulated value; and
a second horizontal scaling operation is performed on the horizontal data using the operation part of the fourth accumulated value; and
wherein when the horizontal accumulated value is equal to or greater than a horizontal threshold value, the vertical accumulated value plus a vertical preset value is taken as the vertical accumulated value, and the horizontal accumulated value, the third accumulated value and the fourth accumulated value are set to have an initial value;

wherein when the vertical accumulated value is equal to or greater the first accumulated value, the first accumulated value plus the first vertical scaling parameter is taken as the first accumulated value;

wherein when the vertical accumulated value is equal to the integer part of the first accumulated value:

the line buffer memory apparatus is controlled to a receive a scan line data corresponding to the vertical accumulated value; and a first vertical scaling operation is performed on the scan line data with the operation part of the first accumulated value; and wherein when the vertical accumulated value is equal to or greater than the second accumulated value, the second accumulated value plus the second vertical scaling parameter is taken as the second accumulated value; and wherein when the vertical accumulated value is equal to the integer part of the second accumulated value:

the line buffer memory apparatus is controlled to receive the scan line data corresponding to the vertical accumulated value; and a second vertical scaling operation is performed on the scan line data using the operation part of the second accumulated value.

16. The image scaling method as claimed in claim 15, wherein an initial value of the first through the fourth accumulated values is 0.

17. The image scaling method as claimed in claim 15, wherein the operation parts of the first, second, third and fourth accumulated values are respectively the non-integer parts of the first, second, third and fourth accumulated values.

18. The image scaling method as claimed in claim 15, wherein when the first horizontal scaling operation is a scaling-up operation, the first horizontal scaling parameter is smaller than 1; while when the first horizontal scaling operation is a scaling-down operation, the first horizontal scaling parameter is larger than 1.

19. The image scaling method as claimed in claim 15, wherein when the first vertical scaling operation is a scaling-up operation, the first vertical scaling parameter is smaller than 1; while when the first vertical scaling operation is a scaling-down operation, the first vertical scaling parameter is larger than 1.

* * * * *